US011851773B2

(12) United States Patent
Cronin et al.

(10) Patent No.: US 11,851,773 B2
(45) Date of Patent: *Dec. 26, 2023

(54) USE OF POLYOXOMETALATE MEDIATORS

(71) Applicant: The University Court of the University of Glasgow, Strthclyde (GB)

(72) Inventors: Leroy Cronin, Glasgow (GB); Mark Symes, Glasgow (GB); Jia-Jia Chen, Glasgow (GB)

(73) Assignee: The University Court of the University of Glasgow, Glasgow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,364

(22) Filed: Dec. 21, 2022

(65) Prior Publication Data

US 2023/0183868 A1 Jun. 15, 2023

Related U.S. Application Data

(63) Continuation of application No. 16/964,557, filed as application No. PCT/EP2019/051807 on Jan. 24, 2019, now Pat. No. 11,572,629.

(30) Foreign Application Priority Data

Jan. 24, 2018 (GB) ...................... 1801170

(51) Int. Cl.
*H01M 4/02* (2006.01)
*C25B 1/04* (2021.01)
*H01M 8/18* (2006.01)

(52) U.S. Cl.
CPC ............... *C25B 1/04* (2013.01); *H01M 8/188* (2013.01)

(58) Field of Classification Search
CPC ...................................................... H01M 4/02
See application file for complete search history.

(56) References Cited

U.S. PATENT DOCUMENTS 4,176,026 A 11/1979 Harriman et al.
4,492,743 A 1/1985 Howe
(Continued)

FOREIGN PATENT DOCUMENTS

WO WO 2007122431 11/2007
WO WO 2009035525 3/2009
(Continued)

OTHER PUBLICATIONS

Bernardini et al. ("Reactivity of one-, two-, three-, and four-electron reduced forms of [P2W18O66)6—generated by controlled potential electrolysis in water" 2011.*
(Continued)

*Primary Examiner* — Jacob B Marks
(74) *Attorney, Agent, or Firm* — Rudy J. Ng; Bozicevic, Field & Francis LLP

(57) ABSTRACT

A method is disclosed of manufacturing a semiconductor structure comprising an (001) oriented zincblende structure group III-nitride layer, such as GaN. The layer is formed on a 3C-SiC layer on a silicon substrate. A nucleation layer is formed, recrystallized and then the zincblende structure group III-nitride layer is formed by MOVPE at temperature T3 in the range 750-1000° C., to a thickness of at least 0.5μ. There is also disclosed a corresponding semiconductor structure comprising a zincblende structure group III-nitride layer which, when characterized by XRD, shows that the substantial majority, or all, of the layer is formed of zincblende structure group III-nitride in preference to wurtzite structure group III-nitride.

The present invention provides methods for producing hydrogen using a mediator that is capable of reversibly (Continued)

donating and accepting four or more electrons. A method of the invention comprises the steps of reducing a mediator by four or more electrons to yield a reduced mediator, and oxidising a reduced mediator to yield a mediator, and reducing protons to yield hydrogen.

23 Claims, 21 Drawing Sheets

(56) References Cited

U.S. PATENT DOCUMENTS

| | | | |
|---|---|---|---|
| 9,543,609 | B2 | 1/2017 | Amstutz et al. |
| 2003/0019758 | A1 | 1/2003 | Gopal |
| 2004/0094408 | A1 | 5/2004 | Omasa |
| 2004/0256247 | A1 | 12/2004 | Carson et al. |
| 2005/0112055 | A1 | 5/2005 | Shannon et al. |
| 2005/0161342 | A1 | 7/2005 | Carson et al. |
| 2007/0012578 | A1 | 1/2007 | Albers et al. |
| 2008/0286643 | A1 | 11/2008 | Iwasaki |
| 2009/0061267 | A1 | 3/2009 | Monzyk et al. |
| 2011/0048962 | A1 | 3/2011 | Reece et al. |
| 2012/0267240 | A1 | 10/2012 | Ke et al. |
| 2014/0050947 | A1 | 2/2014 | Donnelly |
| 2014/0287330 | A1 | 9/2014 | Ohlsen |
| 2014/0318979 | A1 | 10/2014 | Cronin et al. |
| 2015/0349342 | A1 | 12/2015 | Creeth et al. |
| 2016/0043425 | A1 | 2/2016 | Anderson et al. |
| 2017/0297913 | A1 | 10/2017 | Cronin et al. |

FOREIGN PATENT DOCUMENTS

| | | |
|---|---|---|
| WO | WO 2010040897 | 4/2010 |
| WO | WO 2010107919 | 9/2010 |
| WO | WO 2010128333 | 11/2010 |
| WO | WO 2012049494 | 4/2012 |
| WO | WO 2013068754 | 5/2013 |
| WO | WO 2013131838 | 9/2013 |
| WO | WO 2014035919 | 3/2014 |
| WO | WO 2016/038214 | 3/2016 |

OTHER PUBLICATIONS

Abe et al. (2005) "Development of new Photocatalytic Water Splitting into H 2 and 0 2 using Two Different Semiconductor Photocatalysts and a Shuttle Redox Mediator10 3-/I-" J. Phys. Chem. 109 (33) 16052-16061.
Amstutz et al. (2014) "Renewable hydrogen generation from a dual-circuit redox flow battery," Energy Environ. Sci. 7 (7) 2350-2358.
Aricò et al. (2013) "Polymer electrolyte membrane water electrolysis: status of technologies and potential applications in combination with renewable power sources," J. Appl. Electrochem. 43, 107-118.
Armaroli et al. (2011) "The Hydrogen Issue," ChemSusChem. 4, 21-36.
Atlam et al. (2009) "An Experimental and Modeling Study of a Photovoltaic/Proton-Exchange Membrane Electrolyser System," Int. J. Hydrogen Energy 34, 6589-6595.
Bamwenda et al. (2001) "The Photocatalytic Oxidation of Water to O2 over Pure CeO2, WO3, and TiO2 using Fe3+ and Ce4+ as Electron Acceptors," Applied Catalysis A 205, 117-128.
Barber et al. (2009) "Photosynthetic Energy Conversion: Natural and Artificial," J. Chem. Soc. Rev. 38, 185-196.
Barbir et al. (2005) "PEM Electrolysis for Production of Hydrogen from Renewable Energy Sources," Sol. Energy. 78, 661-669.
Bard et al. (1979) "Photoelectrochemistry and Heterogeneous Photocatalysis at Semiconductors," J. Photochem. 10, 59-75.
Bernardini et al., (2011) "Ionic Liquid-Enhanced Photooxidation of Water Using the Polyoxometalate Anion [P2W18O62]6—as the Sensitizer", Inorg. Chem. 50:5899-5909.

Blankenship et al. (2011) "Comparing Photosynthetic and Photovoltaic Efficiencies and Recognizing the Potential for Improvement," Science 332, 805-809.
Bond et al., (2000) Voltammetric Studies of the Interaction of the Lithium Cation with.
Reduced Forms of the Dawson [S2Mo18O62]4—Polyoxometalate, Anion J. Electroanal. Chem. 494: 96-104.
Burke et al.(1977) "The Oxygen Electrod, Part 8.—Oxygen Evolution at Ruthenium Dioxide Anodes," J. Chem. Soc., Faraday Trans. 1, 73, 1659-1671.
Carmo et al. (2013) "A comprehensive review on PEM water electrolysis," International J. Hydrogen Energy 38, 4901-4934.
Chen et al. (2010) "Semiconductor-based Photocatalytic Hydrogen Generation," Chem. Rev. 110, 6503-6570.
Cook et al. (2010) "Solar Energy Supply and Storage for the Legacy and Nonlegacy Worlds" Chem. Rev. 110, 6474-6502.
Damjanovic et al. (1966)"Electrode Kinetics of Oxygen Evolution and Dissolution on Rh, Ir and Pt-Rh Alloy Electrodes," J. Electrochem. Soc. 113, 739-746.
Darwent et al. (1982) "Photo-oxidation of Water Sensitized by W03 Powder," J. Chem. Soc., Faraday Trans. 2. 78, 359-367.
Davis et al. (2010) "Future CO2 Emissions and Climate Change from Existing Energy Infrastructure," Science 329, 1330-1333.
Engstrom et al. (1984) "Characterization of Electrochemically Pretreated Glassy Carbon Electrodes," Anal. Chem. 56, 136-141.
Erbs et al. (1984) "Visible-Light-Induced 02 Generation from Aqueous Dispersions of WO3," J. Phys. Chem. 88, 4001-4006.
Funk et al. (2001) "Thermochemical hydrogen production: past and present," Int. J. Hydrogen Energy 26, 185-190.
Ghassemzadeh et al. (2010) "Chemical Degradation of Nafion Membranes under Mimic Fuel Cell Conditions as Investigated by Solid-State NMR Spectroscopy," J. Phys. Chem. C 114, 14635-14645.
Grätzel et al. (2001) "Photoelectrochemical Cells," Nature 414, 338-344.
Gust et al. (2009) "Solar Fuels Via Artificial Photosynthesis," Acc. Chem. Res. 42(12), 1890-1898.
Hernández-Pagán et al. (2012) "Resistance and polarization losses in aqueous buffer-membrane electrolytes for water-splitting photoelectrochemical cells," Energy Environ. Sci. 5, 7582-7589.
Himeno et al. (2002) "Difference in voltammetric properties between the Keggin-type [XW12O40]n- and [XMo12O40]n-comglexes," J. Electroanal. Chem. 528, 170-174.
Hiskia et al. (1992) "Photocatalytic Oxidation of Organic Compounds by Polyoxometalates of Molybdenum and Tungsten. Catalyst Regeneration by Dioxygen," Inorg. Chem. 31(2), 163-167.
Holladay et al. (2009) "An overview of hydrogen production technologies," Catal. Today 139, 244-260.
Huskinson et al. (2014) "A Metal-Free Organic-Inorganic Aqueous Flow Battery," Nature 505, 195-210.
Hydrogen Production, Worldwide and U.S. Total Hydrogen Production, U.S. Department of Energy Hydrogen Analysis Resource Center 13 pages
Itagaki et al. (2011) "Heteropoly Acid-Based Materials for Reversible H2 Storage as Protons and Electrons under Mild Conditions," Chem. Mater. 23, 4102-4104.
Janoschka et al., (2015) "An Aqueous, Polymer-Based Redox-Flow Battery using Non-corrosive, Safe, and Low-cost Materials", Nature 527, 78-93.
Kanan et al. (2008) "In Situ Fonnation of anOxygen-Evolving Catalyst in Neutral Water Containing Phosphate and Co2+," Science 321, 1072-1075.
Karunadasa et al. (2012) "A Molecular MoS2 Edge Site Mimic for Catalytic Hydrogen Generation," Science, 335, 698-702.
Kato et al., (2013) "Quick and Selective Synthesis of Li6[α-P2W18O62]-28H2O Soluble in Various Organic Solvents†", Dalton Trans. 42, 11363-11366.
Keita et al. (1987) "New Aspects of The Electrochemistry of Heteropolyacids Part II Coupled Electron and Proton Transfers in the Reduction of Silicotungstic Species," J. Electroanal. Chem. 217, 287-304.

(56) References Cited

OTHER PUBLICATIONS

Keita et al., (1987) "New Aspects of The Electrochemistry of Heteropolyacids Part IV. Acidity Dependent Cyclic Voltammetric Behaviour of Phosphotungstic and Silicotungstic Heteropolyanions in Water and, N-N-Dimethylformamide", J. Electmanal. Chem., 227:77-98.

Kourasi et al. (2014) "Heteropolyacids for fuel cell applications," Electrochimica Acta 127, 454-466.

Laconti et al.(2006) "Polymer Electrolyte Membrane Degradation Mechanisms in Fuel Cells-Findings Over the past 30 years and Comparison with Electrolyzers," ECS Trans. 1 (8), 199-219.

Launay (1976) "Reduction De L'ion Metatungstate: States Eleves De Reduction De H2W12O406, Derives De L'ion HW12O40 ET Discussion Generale," J. Inorg. Nucl. Chem. 38(4), 807-816.

Lewis et al. (2006) "Powering the planet: Chemical challenges in solar energy utilization," Proc. Natl. Acad. Sci. U.S.A. 103(43), 15729-15735.

Li et al., (2011) "A Stable Vanadium Redox-Flow Battery with High Energy Density for Large-Scale Energy Storage", Adv. Energy Mater. 1:394-400.

Lin et al., (2015) "Alkaline Quinone Flow Battery", Science 349(6255):1529-1532.

Lodi et al. (1978) Ruthenium dioxide-based film electodes. III. Effect ofchemical composition and surface morphology on oxygen evolution in acid solutions. J. Appl. Electrochem. 8, 135-143.

Long et al.(2010) "Polyoxometalates: Building Blocks for Functional Nanoscale Systems," Angew. Chem. Int. Ed. 49, 1736-1758.

Lu et al. (2006) "Photocatalyst releasing hydrogen from water," Nature 440, 295.

Mamaca et al. (2012) "Electrochemical activity of ruthenium and iridium based catalysts for oxygen evolution reaction," Appl. Catal. B-Environ. 111-112, 376-380.

Maeda et al.(2010) "Efficient Nonsacrificial Water Splitting through Two-Step Photoexcitation by Visible Light using a Modified Oxynitride as a Hydrogen Evolution Photocatalyst," J. Am. Chem. Soc. 132, 5858-5868.

Maeda et al.(1994) "A voltammetric study of Keggin-type heteropolymolybdate anions," J. Electroanal. Chem. 364, 149-154.

Merki et al. (2011) "Amorphous molybdenum sulfide films as catalysts for electrochemical hydrogen production in water," Chem. Sci. 2, 1262-1267.

Millet et al. (2010) "PEM water electrolyzers: From electrocatalysis to stack development," Int. J. Hydrogen Energ. 35, 5043-5052.

Millet et al. (2011) "Electrochemical performances of PEM water electrolysis cells and perspectives," Int. J. Hydrogen Energy 36, 4134-4142.

Miras et al.(2011) "Exploring the Structure and Properties of Transition Metal Templated {VM17(VO4)2} Dawson-Like Capsules," Inorg. Chem. 50, 8384-8391.

Miras et al. (2009) "Unravelling the complexities of inorganic and supramolecular self-assembly in solution with electrospray and cryospray mass spectrometry," Chem. Commun., 1297-1311.

Miseki et al. (2010) "Cs-Modified WO3 Photocatalyst Showing Efficient Solar Energy Conversion for O2 Production and Fe (III) Ion Reduction under Visible Light," J. Phys. Chem. Lett. 1, 1196-1200.

Olah et al. (2011) "Anthropogenic Chemical Carbon Cycle for a Sustainable Future," J. Am. Chem. Soc. 133, 12881-12898.

Onuki et al. (2009) "Thermochemical water-splitting cycle using iodine and sulfur," Energy Environ. Sci. 2, 491-497.

Papaconstantinou and Pope (1967) "Heteropoly Blues. III. Preparation and Stabilities of Reduced 18-Molybdodiphosphates1,2", Inorg. Chem. 6(6):1152-1155.

Paul et al. (2008) "Optimal coupling of PV arrays to PEM electrolysers insolar-hydrogen systems for remote area power supply," Int. J. Hydrogen Energy 33, 490-498.

Pope and Papaconstantinou (1967) "Heteropoly Blues. II. Reduction of 2:18-Tungstates", Inorg. Chem. 6(6): 1147-1152.

Popczun et al. (2013) "Nanostructured Nickel Phosphide as an Electrocatalyst for the Hydrogen Evolution Reaction," J. Am. Chem. Soc. 135, 9267-9270.

Pozio et al. (2003) "Nafion degradation in PEFCs from end plate iron contamination," Electrochim. Acta 48, 1543-1549.

Prenzler et al. (1999) "Coupled Electron- and Proton-Transfer Processes in the Reduction of α-[P2W18O62]6- and α-[H2W12O40]6—As Revealed by Simulation of Cyclic Voltammograms," Analytical Chemistry 71, 3650-3656.

Rausch et al.(2014) "Decoupled catalytic hydrogen evolution from a molecular metal oxide redox mediator in water splitting," Science, 345 (6202) 1326-1330.

Richard et al. (2001) "Synthesis and Redox Characterization of the Polyoxo Anion, γ*-[S2W18O62]4-: A Unique Fast Oxidation Pathway Determines the Characteristic Reversible Electrochemical Behavior of Polyoxometalate Anions in Acidic Media," Inorg. Chem. 40 703-709.

Schrock et al. (2006) "Reduction of dinitrogen," Proc. Natl. Acad. Sci. U.S.A. 103(46), 17087.

Siracusano et al. (2012) "An electrochemical study of a PEM stack for water electrolysis," Int. J. Hydrogen Energ. 37, 1939-1946.

Skolnik (2002) "Compilation of Site Visit-Based Technical Evaluations of Hydrogen Projects 1996-2001" Washingon DC. 1-340.

Sleutels et al. (2009) "Ion transport resistance in Microbial Electrolysis Cells with anion and cation exchange membranes," Int. J. Hydrogen Energy 34, 3612-3620.

Smith & Christian (2008) "Mechanism of the coupled 24-electron reduction and transformations among the "blues", the "browns" and the "reds" of ammonium metatungstate," Electrochim. Acta 53, 2994-3001.

Symes et al. (2013) "Decoupling hydrogen and oxygen evolution during electrolytic water splitting using an electron-coupled-proton buffer" Nature Chem., 5, 403-409.

Tanaka et al. (1982) "Voltammetric and Spectroelectrochemical Studies of 1 2-Molybdophosphoric Acid in Aqueous and Water-Dioxane Solutions at a Gold-Minigrid Optically Transparent Thin-Layer Electrode," Inorg. Chem. 21(4), 1662-1666.

Tsigdinos (1974) "Preparation and Characterization of 12-Molybdophosphoric and 12-Molybdosilicic Acids and Their Metal Salts" Ind. Eng. Chem., Prod. Res. Develop. 13(4), 267-274.

Walter et al. (2010) "Solar Water Splitting Cells," Chem. Rev. 110, 6446-6473.

Wang et al., (2004) "A Single Ionic Conductor Based on Nafion and Its Electrochemical Properties Used as Lithium Polymer Electrolyte", J. Phys. Chem. B 108:1365-1370.

Way et al., (1997) "Multielectron Reduction of α-[S2Mo18O62]4— in Aprotic and Protic Media: Voltammetric Studies", Inorg. Chem. 36:2826-2833.

Xu et al. (2012) "Synthesis and characterization of novel high-performancecomposite electrocatalysts for the oxygen evolution in solidpolymer electrolyte (SPE) water electrolysis," Int. J. Hydrogen Energ. 37, 2985-2992.

Non-Final Office Action U.S. Appl. No. 14/357,066 dated Apr. 1, 2016 17 pages.

Final Office Action U.S. Appl. No. 14/357,066 dated Nov. 4, 2016 19 pages.

Advisory Action U.S. Appl. No. 14/357,066 dated Apr. 14, 2017 3 pages.

Search Report for GB1119283.8 dated Mar. 8, 2012 8 pages.
Search Report for GB1801170.0 dated Aug. 1, 2018 2 pages.
Search Report for GB1416062.6 dated Mar. 12, 2015 4 pages.
Search Report for PCT/GB2012/052784 dated Jan. 30, 2013 15 pages.
ISR and WO for PCT/EP2015/070894 dated Dec. 22, 2015 13 pages.
ISR and WO for PCT/EP2019/051807 dated May 8, 2019 15 pages.

* cited by examiner

A)

F)

G)

USE OF POLYOXOMETALATE MEDIATORS

RELATED APPLICATION

The present application claims the benefit of and priority to GB 1801170.0, filed on 24 Jan. 2018, the contents of which are hereby incorporated by reference in their entirety.

FIELD OF THE INVENTION

The present invention provides the use of a mediator, such as a polyoxometalate, in oxidation and reduction reactions for the storage of electrons, for example for use in methods of hydrogen and/or oxygen generation, or for use as a mediator in a redox flow battery or an air battery.

BACKGROUND

As our reliance on renewable energy sources grows, so too does the need to store this energy in order to smooth out peaks in demand and troughs in supply. Amongst the solutions proposed for this challenge, two stand out in terms of their flexibility and scalability: storage of energy as electrical charge in batteries and storage of energy via conversion to chemical fuels. Both of these approaches bring their own unique set of advantages and drawbacks, and it is often not obvious as to which would make the better choice in any particular circumstance.

Against this background, energy storage solutions such as batholysers that can act as both batteries and fuel generation devices (depending on the requirements of the user) could have a transformative effect on how renewable energy is used.

WO 2013/068754 provides methods for generating hydrogen and/or oxygen using electrochemical, including photochemical, means. The methods use a mediator that may be reliably and reproducibly exploited for reversibly accepting electrons and/or protons. The mediator here may be a polyoxometalate, such as $[Mo_{12}PO_{40}]^{3-}$ (phosphomolybdic acid), or a small organic compound, such as a quinone compound.

WO 2016/038214 also describes the use of a mediator, such as a polyoxometalate, to generate hydrogen and oxygen. Here, the oxygen is generated electrochemically in an electrochemical cell with reduction of the mediator. The reduced mediator is then catalytically reduced outside of the electrochemical cell to generate hydrogen. The oxidised mediator (which is the original mediator) may then be returned to the electrochemical cell for further redox cycles.

The present inventors have found that alternative polyoxometalates may be used in electrochemical cells for reversibly accepting electrons.

SUMMARY OF THE INVENTION

The present inventors have found that mediators which are capable of reversibly accepting a large number of electrons may be used in an electrochemical system for energy storage as electrical charge or for the generation of oxygen and/or hydrogen.

Particularly useful are those mediators that reversibly accept 4 or more electrons, such as 5 or more, such as 6 or more, such as 7 or more, such as 10 or more, for example 18 or more electrons. Here, polyoxometalates are preferred mediators, as such materials are capable of reliably accepting and donating electrons over many redox cycles.

The mediators are able to reversibly accept high numbers of electrons when reduced at modest potentials in aqueous solutions, such as acidic aqueous solutions.

Accordingly, in a general aspect of the invention there is provided the use of a mediator as such for reversibly accepting 4 or more electrons in an electrochemical cell.

In a first aspect of the invention there is provided a method for producing hydrogen, the method comprising the steps of:
  (i) reducing a mediator by four or more electrons to yield a reduced mediator, such as reducing a mediator by four or more electrons at a working electrode of an electrochemical cell;
  (ii) oxidising a reduced mediator to yield a mediator, and reducing protons to yield hydrogen;
  wherein the reduced mediator of step (i) is used as the reduced mediator of step (ii), or the mediator of step (ii) is used as the mediator of step (i).

In a second aspect there is provided a method for generating a reduced mediator, the method comprising the step of reducing a mediator by four or more electrons at a working electrode of an electrochemical cell to yield a reduced mediator.

A mediator, such as described in the methods above, may be is provided in an acidic aqueous electrolyte solution, for example at a pH of pH 4 or less, such as pH 2 or less. Here, the acidity of the aqueous electrolyte solution may be established by appropriate concentrations of the mediator in the electrolyte, and optionally established in combination with the addition of acid or base, such as acid, to the electrolyte.

The mediator is reduced by 4 or more electrons, such as 5 or more electrons, such as 6 or more electrons, such as 7 or more electrons, such as 10 or more electrons, such as 18 or more electrons.

The generation of the reduced mediator may include the concomitant step of oxidising water at a counter electrode to yield oxygen. The oxygen may be collected and stored for later for use, for example as an oxidant.

In a third aspect of the invention there is provided a method for generating a mediator, the method comprising the step of oxidising a reduced mediator by four or more electrons to yield a mediator.

The generation of the mediator may include the concomitant step of generating hydrogen, for example by reducing protons to yield hydrogen. The hydrogen may be collected and stored for later for use, for example as a fuel.

The invention also provides an electrochemical cell comprising a working electrode and a counter electrode optionally together with a reference electrode, and an aqueous electrolyte comprising a mediator that is for reversibly accepting 4 or more electrons.

The cell is suitable for generating a reduced mediator from the mediator.

An electrochemical cell may be provided with a semipermeable membrane, for example, to prevent the mediator and the reduced mediator from contacting the counter electrode. Thus, the mediator and the reduced mediator may be provided at the working electrode side of the electrochemical cell.

Also provided by the invention is a flow cell comprising an electrochemical cell of the invention for generating a reduced mediator from a mediator, wherein the electrochemical cell is provided in fluid communication with a reaction space for generating a mediator from a reduced mediator.

The reaction space may be provided with a catalyst for the catalytic generation of the mediator from the reduced mediator, for example together with the concomitant generation of hydrogen. Here, catalytic generation refers to the non-electrochemical generation of hydrogen from the reduced mediator.

The flow cell is adapted to allow for circulation of mediator- and mediator-containing fluids between the electrochemical cell and the reaction space. Thus, fluids may be provided as a flow cycle within the flow device. Here, the flow cell may allow for generation of hydrogen and oxygen in a spatially separated manner. Thus, each of hydrogen and oxygen may be generated without contamination with the other.

The mediator may be provided in an acidic aqueous electrolyte solution, as previously described.

The flow cell may be provided with a pump for movement of fluids from the electrochemical cell to the reaction space, and from the reaction space to the electrochemical cell.

The invention also allows the use of a mediator as an energy store in a battery, for example a flow battery. Thus, the ability of a mediator to reversibly accept a large number of electrons may be usefully exploited in energy storage applications. The inventors have found that such mediators provide useful energy and power densities when used in flow batteries. Moreover, the batteries are capable of providing useful supply voltages, for example at 1 V or more. The energy and power densities and supplied voltages compare well against those previously reported in the art.

In a further aspect there is provided a battery, the battery comprising a working electrode and a counter electrode, wherein the working electrode side of the battery comprises an electrolyte holding a mediator that may reversibly accept 4 or more electrons, and/or a reduced form of the mediator that may reversibly donate 4 or more electrons. The mediator may be provided in an acidic aqueous electrolyte solution, as previously described.

The counter electrode side of the battery comprises an electrolyte holding a redox active agent, which agent is a couple to the redox active mediator provided in the electrolyte on the working electrode side.

Typically, the electrolyte at the working electrode side is referred to as a negative electrolyte, and the electrolyte at the counter electrode side is referred to as the positive electrolyte.

The working electrode side and the counter electrode side are in fluid communication, such that ionic communication between sides is permitted. The working electrode side and the counter electrode side may be separated by a semi-permeable membrane, such that selected ionic species are permitted to flow between sides. The battery typically does not permit flow of the mediator and its reduced form or the redox active agent and its oxidised form between sides.

The battery may be a flow system adapted to allow flow of electrolyte across the working electrode, and flow of electrolyte across the counter electrode.

The battery may be a charged battery, where the battery contains predominately, such as exclusively, the reduced form of the mediator. The battery may be a discharged battery, where the battery contains predominately, such as exclusively, the mediator (which is the oxidised form of the reduced mediator).

The battery may have an energy density of 100 Wh L$^{-1}$ or more, such as 150 or more, such as 200 or more, for example as measured at 20° C.

The battery may have a power density of 0.4 W cm$^{-2}$ or more, such as 0.5 W cm$^{-2}$ or more, for examples as measured at 20° C.

Also provided by the invention is a method of charging a battery, the method comprising the steps of:
(i) providing a battery comprising a working electrode and a counter electrode, wherein the working electrode side comprises an electrolyte holding a mediator that may reversibly accept 4 or more electrons, which battery may be a battery of the invention;
(ii) applying a potential across the working and counter electrodes, thereby to reduce the mediator to give a reduced mediator, where the mediator has accepted 4 or more electrons.

The mediator may be provided in an acidic aqueous electrolyte solution, as previously described.

The counter electrode side may comprise a redox active agent, which agent may be oxidised in step (ii) to give an oxidised redox active agent.

Also provided by the invention is a method of discharging a battery, the method comprising the steps of:
(i) providing a battery comprising a working electrode and a counter electrode, wherein the working electrode side comprises an electrolyte holding a reduced mediator that may reversibly donate 4 or more electrons, which battery may be a battery of the invention;
(ii) discharging the battery by permitting oxidation of the reduced mediator, thereby to generate a mediator, where the reduced mediator has donated 4 or more electrons.

The counter electrode side may comprise an oxidised redox active agent, which agent may be reduced in step (ii) to give a redox active agent.

The present invention also provides for the use of a battery, which use may include the steps of charging and discharging a battery of the invention, for example over 1 or more, such as 2 or more, such as 5 or more, charge and discharge cycles. The inventors have found that the batteries of the invention maintain their charge density over many cycles, without any appreciable loss in capacity.

Also provided is a battery obtained or obtainable by the charging and discharging methods of the invention.

In yet a further aspect of the invention there is provided the use of the mediator, which is capable of reversibly accepting a large number of electrons, such as described above, in an air battery. Here, an air battery having working and counter electrodes may provide a current flow in a discharging step where oxidation of a reduced mediator is permitted at the working electrode of the air battery, with reduction of oxygen at the counter electrode of the air battery.

In a charging step, a potential is applied across the working and counter electrodes thereby to reduce the mediator at the working electrode to give a reduced mediator, which has accepted 4 or more electrons, and to generate oxygen at the counter electrode.

A suitable electrolyte is provided in the air battery to permit the oxidation and reduction of the mediator species, and to permit the generation and consumption of oxygen. A semi-permeable membrane may be provided to prevent mediator species from contacting the counter electrode. Oxygen may be generated from an oxygen source provided in the electrolyte.

The present invention also provides an air battery, the air battery comprising a working electrode and a counter electrode, wherein the working electrode side of the air battery comprises an electrolyte holding a mediator that may reversibly accept 4 or more electrons, and/or a reduced form of the mediator that may reversibly donate 4 or more electrons. The mediator may be provided in an acidic aqueous electrolyte solution, as previously described.

The counter electrode side of the air battery comprises an electrolyte holding an oxygen source and/or holding or exposed to oxygen.

These and other aspects and embodiments of the invention are described in further detail below.

SUMMARY OF THE FIGURES

(FIG. 6(B)) the change in current density and the changes in current with change in potential and change in scan rate with Cyclic voltammetry scanning at different scan rates in 1 M $H_2SO_4$ within the potential range −0.3 to 0 V vs. Hg/HgSO$_4$ (1 M $H_2SO_4$). A glassy carbon/Toray carbon paper electrode was used as the working electrode, and carbon felt was used as the counter electrode. Right: Current density at a potential of −0.15 V vs. Hg/HgSO$_4$ (1 M $H_2SO_4$) versus the scan rate. As no electrochemical redox reaction happens in this potential range, it is possible to calculate the double layer capacitance from the slope of this line as being around 2.75 mF. Hence, the electrochemically-active area for this glassy carbon/Toray carbon paper electrode is (2.75 mF/4 mF cm$^{-2}$)=0.688 cm$^2$.

FIGS. 7(A) to 7(C) show the charge-discharge curves and the corresponding integration curves used to calculate the energy densities of the $[P_2W_{18}O_{62}]^{6-}$ redox flow battery at a concentration of: FIG. 7(A) 0.1 M in 1M $H_2SO_4$; FIG. 7(B) 0.3 M in 1M $H_2SO_4$; and FIG. 7(C) 0.5 M in 0.1 M $H_2SO_4$. The charging process is shown in the left, and the discharging process on the right (with the integrated are shaded). For FIG. 7(A), the charging energy density is around 57 Wh $L^{-1}$ and the corresponding discharging energy density is around 43.3 Wh $L^{-1}$. Thus, the round-trip energy efficiency is 76%. For FIG. 7(B), the charging energy density is around 170 Wh $L^{-1}$ and the corresponding discharging energy density is around 130 Wh $L^{-1}$. Thus, the round-trip energy efficiency is 76%. For FIG. 7(C), the charging energy density is around 296 Wh $L^{-1}$ and the corresponding discharging energy density is around 225 Wh $L^{-1}$. Thus, the round-trip energy efficiency is 76%.

DETAILED DESCRIPTION

Figure 1:
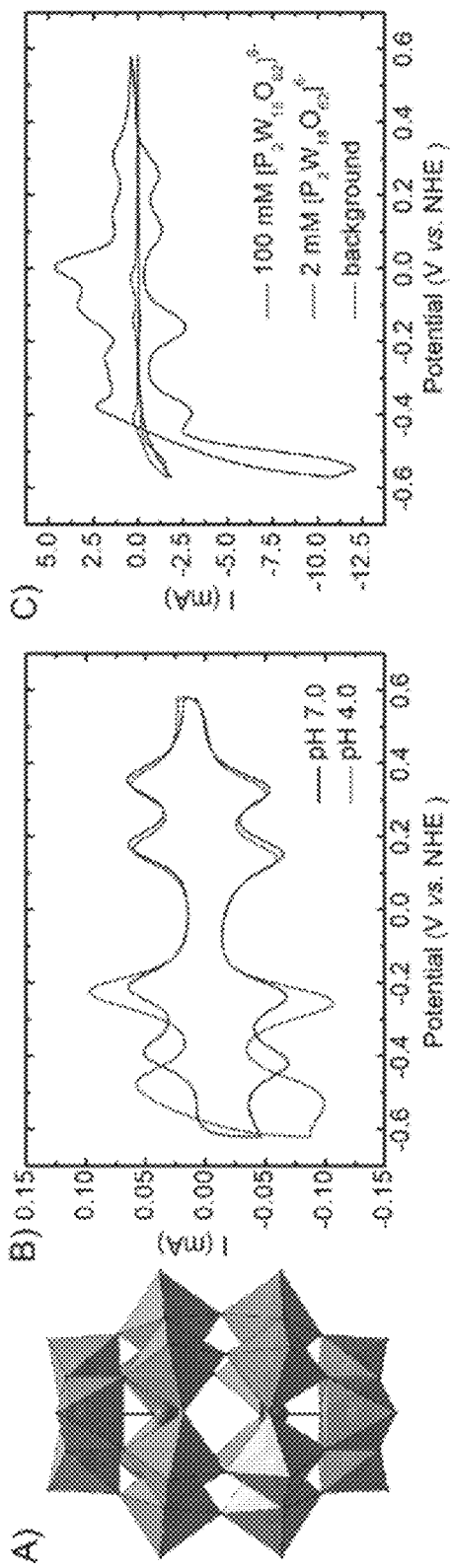
FIG. 1 shows (a) a schematic of the structure of $[P_2W_{18}O_{62}]^{6-}$ (tungsten octahedra and phosphorus spheres); (b) cyclic voltammograms (CVs) of a 2 mM solution of $Li_6[P_2W_{18}O_{62}]$ in 1 M $Li_2SO_4$ (pH 7, black line) and in 1 M $Li_2SO_4/H_2SO_4$ (pH 4, red line) at a scan rate of 10 mV s$^{-1}$; and (c) CVs of a 2 mM solution (red line) and 100 mM solution (black line) of $Li_6[P_2W_{18}O_{62}]$ in 1 M $H_2SO_4$ and a CV of just 1 M $H_2SO_4$ for comparison (blue line). The scan rate was 10 mV s$^{-1}$.

WO 2013/068754 describes the use of a polyoxometalate as a mediator in an electrochemical cell for the reversible acceptance of electrons. However, WO 2013/068754 generally discloses the reversible acceptance of only up to three electrons by each mediator species, limiting the amount of hydrogen and/or oxygen that may be generated from a single mediator. In the worked examples, the reversible acceptance of only two electrons is shown. The energy density of such systems is therefore limited.

Prenzler et al. have reported the electrochemical behaviour of the $\alpha\text{-}[P_2W_{18}O_{62}]^{6-}$ ad $\alpha\text{-}[H_2W_{12}O_{40}]^{6-}$.

The authors appear to show that $[P_2W_{18}O_{62}]^{6-}$ is able to accept up to 4 electrons when reduced in an aqueous electrolyte having a pH value of above 6. However, there is no suggestion by Prenzler et al. that this polyoxometalate could or should be use in methods for hydrogen or oxygen generation. Moreover, there is no discussion on the use of a polyoxometalate to reversibly accept more than 4 electrons.

The POM $[H_2W_{12}O_{40}]^{6-}$ is shown to accept 2 electrons only during its reduction.

Richardt et al. have reported the preparation and analysis of the POM $\gamma^*\text{-}[S_2W_{18}O_{62}]^{4-}$. The electrochemical properties of the POM were investigated by cyclic voltammetry, and the authors describe a four electron reduction/oxidation process. However, as with Prenzler et al., there is no reference to hydrogen and oxygen generation using such a mediator.

Kourasi et al. have reviewed the use of heteropolyacids in fuel cell applications. The review suggests that that polyoxometalate compounds, such as Keggin heteropolyacids, can reversibly accept "several" electrons during reduction. However, there is no disclosure by Kourasi et al. of a system where a polyoxometalate reversibly accepts and donates a high number of electrons during a hydrogen production process.

The review does note the use of phosphomolybdic acid in electrochemical cells for hydrogen and oxygen generation. This is the polyoxometalate described for use in WO 2013/068754.

US 2016/043425 describes a flow battery that includes polyoxometalate species in the anode and cathode sides of the flow cell. This document does not refer to the use of polyoxometalate for the generation of oxygen and hydrogen. The preferred systems are based on two, three-electron polyoxometalate redox couples.

US 2014/0287330 describes a flow battery for generating power from a fuel, such as alcohols, biodiesel and diesel. The flow battery includes a polyoxometalate within an electrolyte for mixing with the fuel. There is no description here of a method for generating hydrogen and oxygen.

The methods described are said to use any suitable polyoxometalate, but where these are explicitly listed they include only phosphomolybdic acid and its relations. As noted above, phosphomolybdic acid is shown to accept two electrons only during its reduction.

In the present case, the inventors have established that a mediator may be used to reversibly accept more than three electrons, for example the mediator may be used to reversibly accept 4, 5, 6, 7, 10, 15, or 18 or more electrons. In the present invention the energy density is high, for example the worked examples in the present case show an energy density of 213 W $L^{-1}$ at an open circuit voltage of 1.25 V. This corresponds to a power density of 0.52 W $cm^{-2}$ at 20° C. for the systems described herein.

In a repeat of their initial work, the inventors have found that that the energy density may be higher, at 225 W $L^{-1}$ at an open circuit voltage of 1.25 V. This is an energy efficiency of 76%.

Further, the present inventors have found that the mediators may be used over many redox cycles without any appreciable loss in integrity. For example, in the flow and air batteries of the invention, do not show any appreciable loss in capacity over repeated charge and discharge cycles.

Mediator

The methods and apparatus of the present case make use of a mediator that has the ability to reversibly accept 4 or more electrons, and more preferably the mediator has the ability to reversibly accept more than 4 electrons. The mediator may be regarded as an oxidised form to the reduced version of the mediator which has reversibly accepted 4 or more electrons.

The mediator has an oxidised state and a reduced state, and the difference between these states is at least four electrons. The mediator may have states between the oxidised and the reduced states, but the oxidation states for use in the methods and apparatus of the invention utilise those states that differ by at least four electrons, and preferably more.

It may be the case that a mediator is capable of existing in states that have a higher oxidation level than the oxidised state, and a lower reduction level than the reduced state.

Such higher and lower oxidation states may be unutilised in the methods of the invention, for example owing to electrochemical constraints in accessing those particular oxidation states, or owing to the instabilities of the oxidation states.

The mediator may be charged or neutral in either of its oxidised or reduced forms. However, in the present case, it is typical for the mediator to be anionic in both its oxidised and reduced forms.

Throughout the description the reduced form of the mediator is referred to as the reduced mediator. The reference to a mediator may therefore be taken as a reference to the oxidised form of the reduced mediator.

The mediator has long term stability in its reduced and oxidised forms. Thus, where the mediator in its reduced form, having accepted four or more electrons for example, the mediator may be retained in this reduced form as a store for electrons, and those electrons may be donated later, as and when required.

The mediator is thus oxidatively stable, and preferably thermally stable also. The present invention makes use of a mediator that has (at least) two different oxidation states, which oxidation states may be accessed by oxidation or reduction from one state to the other. In particular a mediator is thermally and oxidatively stable in both the oxidised form and the reduced form. The mediator in its oxidised and reduced from also does not react with components of the electrochemical cell (e.g. the electrodes and other components of the electrolyte). The mediator may also be stable to light, particularly visible light.

A mediator may reversibly accept 4 or more, 5 or more, 6 or more, 7 or more, 10 or more, 15 or more, or 18 or more electrons.

In the worked examples of the present case, a mediator that is capable of reversibly accepting 18 electrons is beneficially used in a flow chemistry cell and in a battery.

The mediator may be provided in an aqueous mixture. The mixture may be an acidic mixture, as described further herein.

The mediator it typically soluble in the electrolyte for use in an electrochemical cell.

A mediator is an electrochemically active species and may be a compound or complex. A preferred mediator for use is a polyoxoanion, such as a polyoxometalate.

The mediator preferably also has the ability to accept and donate hydrogen ions, together with electrons. The use of a mediator having proton accepting and donating ability is set out in WO 2013/068754.

The ability of a species to act as a mediator to reversibly accept 4 or more electrons may be determined by electrochemical experiments, including cyclic voltammetry, as described herein.

Polyoxometalate

In a preferred embodiment, the mediator for use in the invention is a polyoxometalate, including the salts and solvates thereof. The inventors have found that polyoxometalate compounds are capable of reversibly accepting high numbers of electrons, and can do so reliably and repeatedly over a large number of redox cycles. In the worked examples of the present case, the polyoxometalate $[P_2W_{18}O_{62}]^{6-}$ is used to exemplify the utility of mediators that are capable of reversibly accepting high numbers of electrons.

Polyoxometalates show tremendous promise in this regard, because of their ability to store multiple electrons in a reversible manner (see Pope et al., Papaconstantinou et al.). For example, Launay reported that silicotungstic acid ($[H_2W_{12}O_{40}]^{6-}$) can be highly reduced in aqueous solution (Launay et al), whilst Bond and co-workers have reported that the polyoxometalate $\alpha\text{-}[S_2Mo_{18}O_{62}]^{4-}$ is capable of taking part in extensive redox processes on the voltammetric timescale in mixed acetonitrile/water solutions (Way et al. Bond et al.). In many of these cases, the effects of adding protons or other small cations (e.g. $Li^+$) have been shown to be crucial for modifying the redox potentials of the polyoxometalates, facilitating the generation of reduced species at less cathodic potentials compared to when these cations are absent.

The use of polyoxometalate reported to date has been associated with low power and energy densities.

In one embodiment, the mediator for use in the present invention is a polyoxometalate. The polyoxometalate is an oxo-anion of a transition metal cluster. In one embodiment, the polyoxometalate is an acidic polyoxometalate, and references to polyoxometalate may be construed accordingly. Polyoxometalates for use as mediators, and the acid forms thereof, are thermally and oxidatively stable.

As noted above, the mediator may be a polyoxometalate.

In one embodiment, the polyoxometalate comprises at least 12, 18, 24, 30 or 132 metal atoms.

In one embodiment, the polyoxometalate comprises 12, 18, 24, 30 or 132 metal atoms, such as 18 metal atoms.

The number of oxygen atoms is determined by the number of metal atoms present in the polyoxometalate, and the particular structure adopted by the cluster.

The polyoxometalate may have a major metal atom component and an oxygen component, and optionally one or more further heteroatom components selected from P, Si, S, Ge, Fe, W, V, Mo, Mn, Se, Te, As, Sb, Sn, and Ti. Preferably, the polyoxometalate contains one or more, such as two, P or S heteroatom components.

In one embodiment the metal atoms in the polyoxometalate are selected from the group consisting of Mo, W and V, and combinations thereof.

In one embodiment the metal atoms in the polyoxometalate are W atoms.

In addition to any of the W, Mo, and/or V atoms present, the polyoxometalate may further comprise Ti, V, Cr, Mn, Fe, Co, Ni, Cu, and/or Zn.

In addition to any of the W, Mo, V and/or Nb atoms present, the polyoxometalate may further comprise Sn, Pb, Al, and/or Hg.

In one embodiment, the polyoxometalate is a Dawson-type polyoxometalate.

In one embodiment, the polyoxometalate is a Keggin-type polyoxometalate, such as a mixed metal Keggin-type polyoxometalate.

For example, the polyoxometalate may have the general formula $[W_{12-x}Mo_xXO_{40}]^{n-}$ or Dawson $[W_{18-x}Mo_xXO_{62}]^{y-}$. Here, X may be selected from P, S and Si. The value of x may be varied, and may be 1 or 2 for example. One or more, such as two, metal atoms may be replaced with, for example, Fe or Mn.

The polyoxometalate may be of formula $[X_2M_{18}O_{62}]^{n-}$, where M is a metal, selected from Mo, W and V, and mixtures thereof, X is selected from P and S and mixtures thereof, and n is 3, 4, 5 or 6 as appropriate, where the polyoxometalate is provided with one or more balancing counter cations.

The polyoxometalate may be of the formula $[P_2W_{18}O_{62}]^{6-}$. The polyoxometalate may be provided together with alkali metal counter ions, such as lithium counter ions.

Methods

The present invention provides the use of a mediator in an electrochemical cell. The mediator is present in the cell electrolyte, which is located in the interelectrode space. Typically the mediator is located at the working electrode side of the cell, and may be prevented from contacting the counter electrode.

In an aspect of the invention there is provided a method for generating a reduced mediator, the method comprising the step of reducing a mediator by four or more electrons at a working electrode of an electrochemical cell to yield a reduced mediator.

The method may include the concomitant step of oxidising water at a counter electrode to yield oxygen. The oxygen may be collected and stored for later for use, for example as an oxidant.

The reduced mediator may be oxidised to re-generate the mediator. This oxidation step may be accompanied by the generation of hydrogen.

In a further aspect of the invention there is provided a method for generating a mediator, the method comprising the step of oxidising a reduced mediator by four or more electrons to yield a mediator.

The mediator may be generated non-electrochemically, such as catalytically, or it may be generated electrochemically.

The method for generating a mediator may include the concomitant step of generating hydrogen, for example by reducing protons to yield hydrogen. The hydrogen may be collected and stored for later for use, for example as a fuel. Hydrogen may preferably be generated catalytically from the reduced mediator. Alternatively, the reduced mediator may be a hydrogen source, for example in the catalytic methods for generating hydrogen.

The mediator may be reduced to re-generate the reduced mediator. The reduction step may be accompanied by the generation of oxygen.

In a further aspect of the invention there is provided a method for producing hydrogen and oxygen, the method comprising the steps of:
 (i) reducing a mediator by four or more electrons to yield a reduced mediator, and oxidising water to yield oxygen;
 (ii) oxidising a reduced mediator to yield a mediator, and reducing protons to yield hydrogen;
 wherein the reduced mediator of step (i) is used as the reduced mediator of step (ii), or the mediator of step (ii) is used as the mediator of step (i).

Step (i) may be a step of reducing a mediator by four or more electrons at a working electrode of an electrochemical cell to yield a reduced mediator.

Preferably, step (i) is performed with the mediator provided in an acidic electrolyte solution, such as described below.

A mediator may be provided in an aqueous electrolyte. The mediator is typically provided in solution within that aqueous electrolyte.

In the methods described above, the mediator and the reduced mediator may be prevented from contacting the counter electrode, for example through appropriate placement of a semi-permeable membrane between the working and counter electrodes.

The concentration of the mediator in the electrolyte may be at least 2, 5, 10, 20 or 50 mM. The concentration of the mediator in the electrolyte may be at most 100, 150, 200, 500, 1,000, 2,000, or 5,000 mM.

In one embodiment, the concentration of the mediator in the electrolyte may be in a range with the lower and upper limits selected from the values given above. For example, the concentration of the mediator in the electrolyte may be in a range 5 to 2,000 mM, such as 5 to 100 mM.

The mediator may be used in an acidic aqueous electrolyte. The pH of the electrolyte may be less than pH 7, such as pH 6 or less, such as pH 5 or less, such as pH 4 or less, or such as pH 3 or less.

In one embodiment, the pH of the acidic aqueous electrolyte is no less than pH −1, such as no less than pH 0.

The pH of the acidic aqueous electrolyte may be about pH 0, about pH 2 or about pH 4.

The pH of the electrolyte may be determined by the amount of mediator that is added to the aqueous electrolyte. The amount of mediator that is added may be sufficient to obtain a desired pH of the electrolyte, such as a pH mentioned above. The amount of mediator in the electrolyte may be in an amount as specified in the preferred concentrations given above.

It is preferred that the mediator is used at low pH. This may correspond to the use of the mediator at high concentration in the aqueous electrolyte.

Alternatively or additionally, an electrolyte may be acidified by addition of an appropriate acid, such as inorganic acid, to an aqueous electrolyte.

The inventors have found that the reduction behaviour of a mediator may be proton-coupled. Thus, the number of electrons that is accepted by the mediator in a reduction reaction is affected by the acidity of the aqueous environment. Typically, a mediator can store a greater number of electrons when the concentration of protons in solution is increased (and thus pH is decreased).

Thus, the methods of the present case are typically performed with the mediator provided in an acidic, such as highly acidic, aqueous electrolyte solution, such as those described above.

An increase in aqueous electrolyte acidity would be expected to favour the reduction of those protons under a cathodic bias to yield hydrogen. Under experimental conditions using a mediator at very high concertation in strong acid, the redox activity observed in the cyclic voltammetry is attributable to that of the mediator and not due to background processes, such as hydrogen evolution.

The methods of the invention may be performed at ambient temperature, or a temperature above ambient. For example, the methods of the invention may be performed at a temperature in the range 10 to 90° C., such as 10 to 80° C.

The methods of the invention may be performed at ambient temperature, for example at a temperature in the range 10 to 25° C., such as 15, 20 or 25° C.

The inventors have found that the stability of a reduced mediator may be beneficially exploited to use the mediator as an electron store in an energy storage device.

In a further method of the invention there is provided a method of storing electrons, the method comprising the step of reducing a mediator by 4 or more electrons at a working electrode in an electrochemical cell. Here, the counter electrode, which is separated from the working electrode by a semi-permeable membrane, is used to oxidise a redox active species, such as HBr, TEMPO, or other species. The electrochemical cell is operated under an applied potential across the working and counter electrodes.

The electrons may be released from the reduced mediator as required in an oxidation step, which may be performed in an electrochemical cell, and may also feature the reduction of the oxidised form of the second mediator species. This step may be referred to as a discharge step. This step may be referred to as a charging step and it develops a useable potential across the working and counter electrodes.

The inventors have found that the mediators for use in the present case have a high energy density and a high discharge capacity. As such, the inventors have found that the mediators are suitable for use in battery systems for the supply of energy, such as flow batteries.

Accordingly, the invention provides a method of charging a battery, the method comprising the steps of:
(i) providing a battery comprising a working electrode and a counter electrode, wherein the working electrode side comprises an electrolyte holding a mediator that may reversibly accept 4 or more electrons, which battery may be a battery of the invention;
(ii) applying a potential across the working and counter electrodes, thereby to reduce the mediator to give a reduced mediator, where the mediator has accepted 4 or more electrons.

The mediator may be provided in an acidic aqueous electrolyte solution, as previously described.

The counter electrode side may comprise a redox active agent, which agent may be oxidised in step (ii) to give an oxidised redox active agent.

Also provided by the invention is a method of discharging a battery, the method comprising the steps of:
(i) providing a battery comprising a working electrode and a counter electrode, wherein the working electrode side comprises an electrolyte holding a reduced mediator that may reversibly donate 4 or more electrons, which battery may be a battery of the invention;
(ii) discharging the battery by permitting oxidation of the reduced mediator, thereby to generate a mediator, where the reduced mediator has donated 4 or more electrons.

The counter electrode side may comprise an oxidised redox active agent, which agent may be reduced in step (ii) to give a redox active agent.

The present invention also provides for the use of a battery, which use may include the steps of charging and discharging a battery of the invention as described above, for example over 1 or more, such as 2 or more, such as 5 or more, charge and discharge cycles. The inventors have found that the batteries of the invention maintain their charge density over many cycles, without any appreciable loss in capacity.

In further aspect, the reduction and oxidation of the mediator may be coupled to the consumption and generation of oxygen in a battery. Thus, the invention also provides the use of a mediator in an air battery, such as for the generation of a current flow.

Accordingly, there is provided by the invention a method of discharging an air battery, the method comprising the steps of:
(i) providing an air battery comprising a working electrode and a counter electrode, wherein the working electrode side of the air battery comprises an electrolyte holding a reduced mediator that may reversibly donate 4 or more electrons, and the counter electrode side of the air battery comprises an electrolyte holding or exposed to oxygen;
(ii) discharging the air battery by permitting oxidation of the reduced mediator at the working electrode, thereby to generate a mediator, where the reduced mediator has donated 4 or more electrons, and permitting reduction of oxygen at the counter electrode.

There is also provided a method of charging an air battery, the method comprising the steps of
(i) providing an air battery comprising a working electrode and a counter electrode, wherein the working electrode side of the air battery comprises an electrolyte holding a mediator that may reversibly accept 4 or more electrons, and the counter electrode side of the air battery comprises an electrolyte holding an oxygen source;
(ii) applying a potential across the working and counter electrodes, thereby to reduce the mediator at the working electrode to give a reduced mediator, where the mediator has accepted 4 or more electrons, and generating oxygen from the oxygen source at the counter electrode.

A suitable electrolyte is provided in the air battery to permit the oxidation and reduction of the mediator species, and to permit the generation and consumption of oxygen. An electrolyte may be an aqueous electrolyte, such as an acidic aqueous electrolyte, as described herein.

A semi-permeable membrane may be provided to prevent mediator species from contacting the counter electrode.

The present invention also provides for the use of an air battery, which use may include the steps of charging and discharging a battery of the invention as described above, for example over 1 or more, such as 2 or more, such as 5 or more, charge and discharge cycles.

Apparatus

The present case also provides an electrochemical cell comprising a mediator as described herein. The electrochemical cell typically comprises a working electrode and a counter electrode, optionally together with a reference electrode. The electrochemical cell may be provided as a component of a flow cell as described in further detail below, or the electrochemical cell may be a feature of a battery as also described below.

The cell has an aqueous electrolyte comprising a mediator, as described herein. The counter electrode and the working electrode are suitable for electrical connection, or are electrically connected.

The working and counter electrodes define an electrochemical space in which an electrolyte is provided. In one embodiment, the electrochemical space is divided by a semi-permeable membrane to provide a working electrode electrolyte space and a counter electrode electrolyte space. The mediator is provided in the working electrode electrolyte space. No mediator is provided in the counter electrode space. The semi-permeable membrane prevents movement of the mediator (in either the oxidised or reduced form) from moving from the working electrode electrolyte space to the counter electrode electrolyte space. The mediator is thereby prevented from contacting the counter electrode surface.

A set up whereby the mediator is separated from the counter electrode side of the cell is advantageous in that the mediator cannot interfere with the chemistries that are occurring at the counter electrode.

The working and counter electrodes are electrically connected or connectable.

In one embodiment the electrochemical cell may further comprise a voltage supply (or power supply). The voltage supply is preferably adapted to supply a constant bias between the working electrode and the counter electrode or the reference electrode, where present. The voltage supply is adapted to supply a constant bias of up to 2.0 V. In one embodiment, the voltage supply is adapted to supply a constant bias of around 1.0 V. The voltage supply is reversible as required.

The electrodes for use in the present case are not particularly limited and may be chosen appropriately for use in hydrogen generation and oxygen generation steps, as necessary. Suitable electrode materials are described in WO 2013/068754. For example, a working electrode may be a carbon electrode, a platinum or platinum-containing electrode. For example, a counter electrode may be platinum, such as where the electrode is used to generate hydrogen, or iridium or iridium oxide, such as where the electrode is used to generate oxygen.

The electrochemical cell may further comprise a detector for monitoring current. The electrochemical cell may further comprise a controller for controlling the voltage supply and timing of that supply.

A membrane is provided to prevent the movement of the mediator from the working electrode side of the electrochemical cell (the working electrode electrolyte space) to the counter electrode side of the electrochemical cell (the counter electrode electrolyte space). The membrane permits movement of other ions, such as protons, from the working electrode electrolyte space to the counter electrode electrolyte space, and vice versa.

In one embodiment, the membrane is a cationic permeable membrane.

In one embodiment, the membrane is a proton permeable membrane.

In one embodiment, the membrane is a membrane that is impermeable to molecules having a molecular weight of 200 or more, 500 or more, or 1,000 or more.

The membrane is not particularly limited so long as the membrane is capable of preventing movement of the mediator therethrough, whilst permitting movement of cations, particularly protons therethrough. The membrane may therefore said to be impermeable to the mediator.

Suitable for use in the present case are membranes containing a sulfonated tetrafluoroethylene based fluoropolymer-copolymer. Nafion membranes are examples of commercially available membranes of this type.

In a preferred embodiment of the invention there is provided a flow cell for use in the generation of oxygen and/or hydrogen using a mediator as described herein. The flow cell comprises an electrochemical cell holding the mediator in the interelectrode space. The electrochemical cell is in fluid communication with a reaction space, and the flow cell may be provided with a pump to enable fluid communication to and from the electrochemical cell to the reaction space.

The electrochemical cell allows for reduction of the mediator at the working electrode, the reduced mediator is then passable to the reaction space. The reduced mediator is oxidisable in the reaction space. The oxidised mediator, which may take the same form as the original mediator, is then passable to the electrochemical cell for a repeat reduction.

The flow cell may operate continuously to provide continuous passage of reduced mediator from the electrochemical cell to the reaction space, and continuous passage of oxidised mediator from the reaction space to the electrochemical cell.

The reaction space is provided for reaction of the reduced mediator in an oxidation reaction. In this reaction hydrogen may be generated, and is preferably generated. Here, the oxidation of the reduced mediator is performed in a space spatially separate from the electrochemical cell. The conditions in the reaction space may be optimised for the oxidation of the reduced mediator, whilst the conditions in the electrochemical cell may be optimised for the reduction of the mediator.

The present inventors have previously described in WO 2013/068754 and WO 2016/038214 methods and systems for generating hydrogen from a reduced mediator, such as a polyoxometalate mediator. Those methods and systems may be used in the present case to generate an oxidised mediator in the reaction space, optionally together with the generation of hydrogen.

The reduced mediator may be oxidised by non-electrochemical methods. For example, the reduced mediator may be catalytically oxidised, for example by contact of a solution comprising the reduced mediator with a heterogeneous catalyst. A reduced mediator, such as a reduced polyoxometalate may be oxidised catalytically using a metal catalyst, such as a Pt catalyst.

A metal catalyst may be provided on a support, such as a carbon support. For example, a polyoxometalate may be oxidised in the presence of a Pt on carbon catalyst.

In an alternative embodiment, the reduced mediator may be diluted, thereby to reduce the concentration of the mediator in the aqueous electrolyte. Dilution of the electrolyte solution may also raise the pH (lower the acid concentration) of the aqueous electrolyte.

The inventors have found that the stability of a reduced mediator, such as a polyoxometalate mediator, is highest at low pH (high acid concentration). Thus, a reduction in acid concentration may be associated with a decrease in the reduced mediator stability. Increasing the instability of the reduced mediator may be used as a method for permitting the oxidation of the reduced mediator. The reduced mediator may convert to an oxidised form at a higher pH with the concomitant generation of hydrogen.

In a continuous flow system the diluted electrolyte may be taken to a higher concentration of the oxidised mediator species for re-circulation into the reduction reaction. For example, the solution may be concentrated, or additional mediator may be added to the electrolyte solution.

In an alternative embodiment, the reduced mediator may be oxidised by electrochemical methods. Thus, the reaction space may be an electrochemical cell for oxidation of the reduced mediator at a working electrode of the cell.

As noted above, the reduced mediator may be oxidised in the electrochemical cell by simple reverse of the bias in the electrochemical cell after production of the reduced mediator. However, in a continuous flow system the electrochemical generation of the oxidised mediator may be achieved by the use of a second electrochemical cell provided in the reaction space that is in fluid communication with the electrochemical cell which generates the reduced mediator.

The second electrochemical cell provided in the reaction space may be configured in a similar manner to the electrochemical cell for generating the reduced mediator. Thus, the second cell may be provided with a working and counter electrode, and these are connected or connectable to a power supply. The electrochemical cell may be provided with a semi-permeable membrane to prevent the reduced mediator and the mediator from contacting the counter electrode.

Where hydrogen is generated with concomitant generation of an oxidised mediator, the hydrogen may be collected, such as for storage and for use as a fuel.

The electrochemical cell and the reaction space may be provided with interconnecting flow channels to allow for separate transfer of fluids to and from the cell and the space. Thus, a flow channel is provided for transfer of the reduced mediator to the reaction space, and a separate flow channel is provided for transfer of the oxidised mediator (the mediator) to the electrochemical cell.

The apparatus allows for the flow of electrolyte through the electrochemical cell. The flow rate may be chosen to minimise mass transport overpotentials, for example at the cathode side of the electrochemical cell. For example, the flow rate through the electrochemical cell may be at least 0.5 mL, at least 1 mL, at least 5, at least 10, at least 50, or at least 100 mL min$^{-1}$, for example where the electrochemical cell volume is 1 mL.

If needed, a holding tank may be provided in line with a flow channel. The holding tank may be provided for storage of fluid in transfer, for example for use in controlling the rate of addition into one of the electrochemical cell and the reaction space, such as the reaction space. The holding tank may be used to ensure an even and constant supply of fluids in the fluid cell by maintaining a surplus of fluid in the system.

The mediators for use in the present invention, together with their reduced forms, are typically thermally stable, and therefore the temporary storage of a mediator in a holding tank is not problematic.

In a further aspect, there is provided a system for the generation of hydrogen and/or oxygen, the system comprising a plurality of flow cells according to the invention.

Alternatively the flow cell may operate in batch mode. Thus, there is no continuous flow of material to and from the electrochemical cell and the reaction space. Instead, material may be transferred between the electrochemical cell and the reaction space in batches as and when required.

In further aspects of the invention, there is provided a battery for use in energy storage and delivery. The battery uses a mediator, as described herein, as an energy vector to hold and deliver electrons within an electrochemical cell, for example a cell forming part of a flow battery. Here, the ability of a mediator to reversibly accept a large number of electrons may be usefully exploited, and this is seen in the worked examples of the present case.

A battery comprising a mediator as described herein can provide useful energy and power densities, and these energy and power densities have been found to surpass the energy and power densities reported in the art for flow systems that use redox couples based on species that reversibly accept small numbers of electrons only (such as one or two electrons). The batteries of the invention may be charged and discharged over many cycles without any appreciable loss in capacity density.

Accordingly, the present invention provides a battery comprising a working electrode and a counter electrode, wherein the working electrode side comprises an electrolyte holding a mediator that may reversibly accept 4 or more electrons, and/or a reduced form of the mediator that may reversibly donate 4 or more electrons.

The mediator for use in battery is a mediator as described herein, for example it may be a polyoxometalate. The mediator may be provided in an aqueous electrolyte, such as an acidic aqueous electrolyte, as described herein.

The working and counter electrodes in the battery are electrically connected or connectable. The battery may be connectable to a voltage supply (or power supply), for example, where the battery is to be charged.

Here, the counter electrode side of the battery comprises an electrolyte holding a redox active agent, which agent is a couple to the redox active mediator provided in the electrolyte on the working electrode side.

Typically, the electrolyte at the working electrode side is referred to as a negative electrolyte, and the electrolyte at the counter electrode side is referred to as the positive electrolyte.

The identity of the redox active agent at the counter electrode side may be any suitable positive electrolyte. A number of different species are known in the art and a suitable partner to the mediator may be selected depending on the specific requirements of the system, as will be apparent to a person skilled in the art.

For example, Br, $VO^{2+}$, TEMPO and ferrocyanide are frequently used as active species (together with their reduced forms) in flow batteries, and the worked examples of the present use Br (with HBr) in a flow system.

The mediator and the redox active agent may be provided in suitable electrolytes, such as aqueous electrolytes. The acidity of the electrolytes may be selected appropriately for the electrochemistry to be undertaken.

The working electrode side and the counter electrode side are in ionic communication. The working electrode side and the counter electrode side may be separated by a semipermeable membrane, such as described herein. In other embodiments, an ionic bridge may be provided between working and counter sides, though this is less preferred.

The battery typically does not permit flow of the mediator and its reduced form or the redox active agent and its oxidised form between sides.

The battery may be a flow system adapted to allow flow of electrolyte across the working electrode and flow of electrolyte across the counter electrode. The battery may be provided with one or more pumps to allow the transfer of the electrolytes through the working electrode side and the counter electrode side of the battery.

Suitable holding tanks may be provided upstream and downstream of the working and counter electrodes to hold and receive electrolyte for delivery to and from the working and counter electrodes. Suitable channels, such as piping, may be provided in communication with the tanks and the electrodes to permit electrolyte transfer.

The battery of the invention may be a charged battery, where the working side of the battery contains predominately, such as exclusively, the reduced form of the mediator. The battery may be a discharged battery, where the working side of the battery contains predominately, such as exclusively, the mediator (which is the oxidised form of the reduced mediator).

A battery that is neither fully charged nor fully discharged may comprise both the mediator and the reduced form of the mediator. Typically, in a flow system these are located separately within the battery, for example upstream and downstream of the working electrode.

A battery of the invention is obtained or obtainable by the charging and discharging methods of the invention.

The battery may have an energy density of 100 Wh L$^{-1}$ or more, such as 150 or more, such as 200 or more, for example as measured at 20° C.

The battery may have a power density of 0.4 W cm$^{-2}$ or more, such as 0.5 W cm$^{-2}$ or more, for examples as measured at 20° C.

The present invention also provides an air battery, the air battery comprising a working electrode and a counter electrode, wherein the working electrode side of the air battery comprises an electrolyte holding a mediator that may reversibly accept 4 or more electrons, and/or a reduced form of the mediator that may reversibly donate 4 or more electrons. The mediator may be provided in an acidic aqueous electrolyte solution, as previously described.

The counter electrode side of the air battery comprises an electrolyte holding an oxygen source and/or holding or exposed to oxygen.

The working and counter electrodes in the air battery are electrically connected or connectable. The air battery may be connectable to a voltage supply (or power supply), for example, where the air battery is to be charged.

The air battery typically does not permit flow of the mediator and its reduced form between sides. Thus, a semi-permeable membrane may be provided to prevent mediator species from contacting the counter electrode.

The air battery of the invention may be a charged air battery, where the working side of the battery contains predominately, such as exclusively, the reduced form of the mediator. The air battery may be a discharged air battery, where the working side of the battery contains predominately, such as exclusively, the mediator (which is the oxidised form of the reduced mediator).

An air battery that is neither fully charged nor fully discharged may comprise both the mediator and the reduced form of the mediator.

Other Preferences

Each and every compatible combination of the embodiments described above is explicitly disclosed herein, as if each and every combination was individually and explicitly recited.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

Certain aspects and embodiments of the invention will now be illustrated by way of example and with reference to the figures described above.

EXPERIMENTAL AND RESULTS

The following examples are provided solely to illustrate the present invention and are not intended to limit the scope of the invention, as described herein.

Synthesis of $Li_6[P_2W_{18}O_{62}]$

The preparation of $Li_6[P_2W_{18}O_{62}]$ was similar to the procedure reported in Kato et al. Lithium tungstate ($Li_2WO_4$, 153 g, 0.58 mol) was dissolved in boiling water (240 mL in a 1 L round-bottomed flask) and stirred for 30 min. Then, 320 g of 85% phosphoric acid ($H_3PO_4$) was added slowly. After refluxing for at least 12 h followed by cooling to 60° C., lithium chloride (LiCl, 200 g) was added to the lukewarm solution, followed by refluxing for 6 h, yielding a precipitate. The precipitate was first recrystallized from methanol and then subsequently recrystallized from LiCl solution (3.28 M) and filtered to remove any white precipitate that remained. The isomeric purity was confirmed by using $^{31}P$-NMR, which showed a single peak at −13.03 ppm, consistent with Kato et al. (data not shown).

Cyclic Voltammetry

The redox chemistry displayed by $[P_2W_{18}O_{62}]^{6-}$ (prepared by the above synthesis method) in aqueous solution was observed by cyclic voltammetry (CV) experiments in a thin layer electrochemical cell, with voltammagrams such as those shown in FIGS. 1(b) and 1(c).

At low concentrations (2 mM), $[P_2W_{18}O_{62}]^{6-}$ displays four reversible waves within the range +0.6 to −0.6 V (vs. SHE). At pH 7, each of these waves is a simple one-electron process (FIG. 1(b), black line), but as the pH is lowered to 4, both of the peaks below 0 V become two-electron processes, as may be determined by controlled bulk electrolysis and by UV-vis titration (as previously observed, see Pope et al., Keita et al., and Bernardini et al.).

FIG. 1(c) shows the effect of lowering the pH of the medium to zero and increasing the polyoxometalate concentration to 100 mM. The CV (black line in FIG. 1(c)) shows a significantly enhanced redox wave at around −0.5 V compared to that exhibited by either lower polyoxometalate concentrations or at higher pH. Meanwhile, the blue line in FIG. 1(c) shows the corresponding CV run in the supporting electrolyte alone: clearly the current observed in the enhanced redox wave at −0.5 V is not simply due to background processes (such as hydrogen evolution).

All the electrochemical data were collected using a Biologic SP-150 potentiostat. A thin layer electrochemical cell was used for cyclic voltammetry (CV) measurements, to avoid any issues associated with the low diffusion coefficient of reduced Dawson-type polyoxometalates such as $[P_2W_{18}O_{62}]^{6-}$. A glassy carbon button electrode (area=0.071 $cm^2$) was used as working electrode, carbon felt was used as the counter electrode and $Hg/HgSO_4$ (1 M $H_2SO_4$) was used as the reference electrode.

Figure 6:
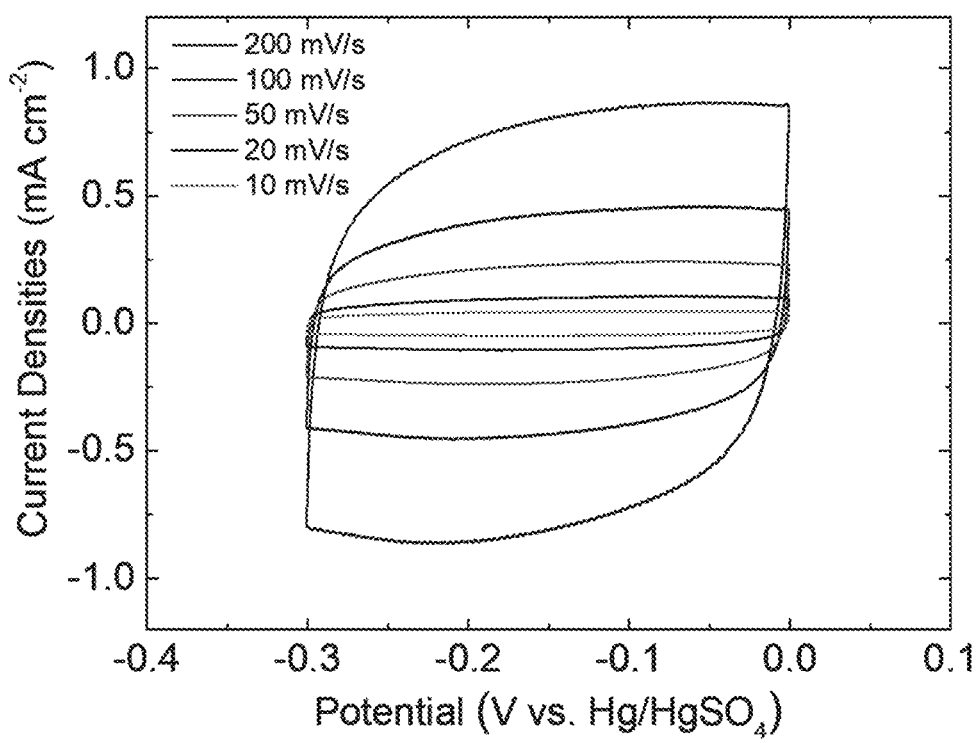
FIGS. 6(A) and 6(B) show (FIG. 6(A)) the change in current densities with change in potential and change in scan rate with cyclic voltammetry scanning at different scan rates in 1 M $H_2SO_4$ within the potential range −0.3 to 0 V vs. Hg/HgSO$_4$ (1 M $H_2SO_4$). A glassy carbon electrode (area=0.071 cm$^2$) was used as the working electrode, and carbon felt was used as the counter electrode. Right: Current density at a potential of −0.15 V vs. Hg/HgSO$_4$ (1 M $H_2SO_4$) versus the scan rate. As no electrochemical redox reaction happens in this potential range, it is possible to calculate the double layer capacitance from the slope of this line as being 4 mF cm$^{-2}$.
Figure 6:
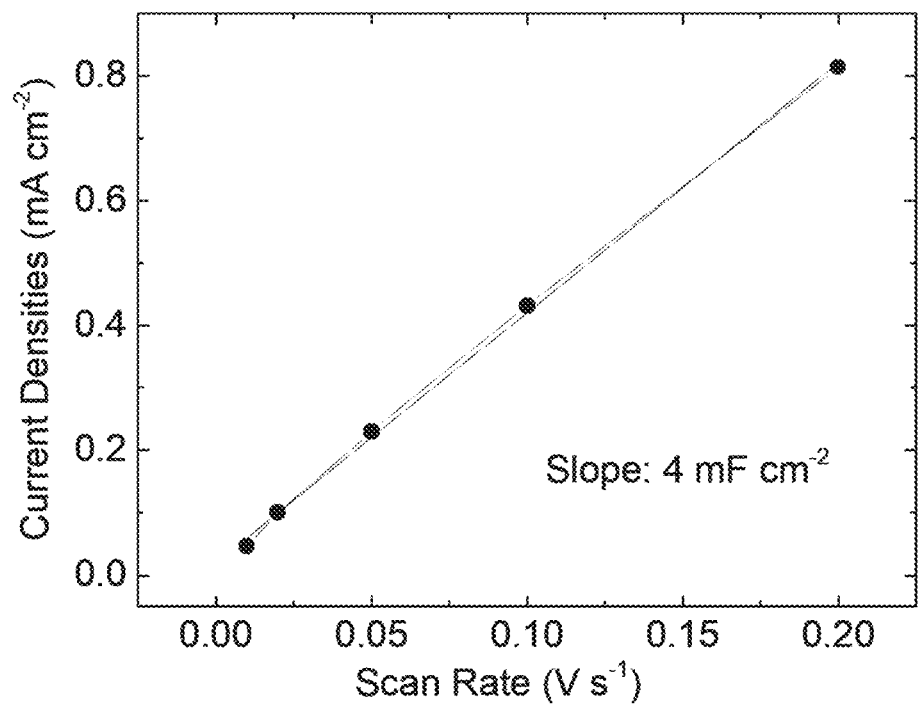
Figure 6:
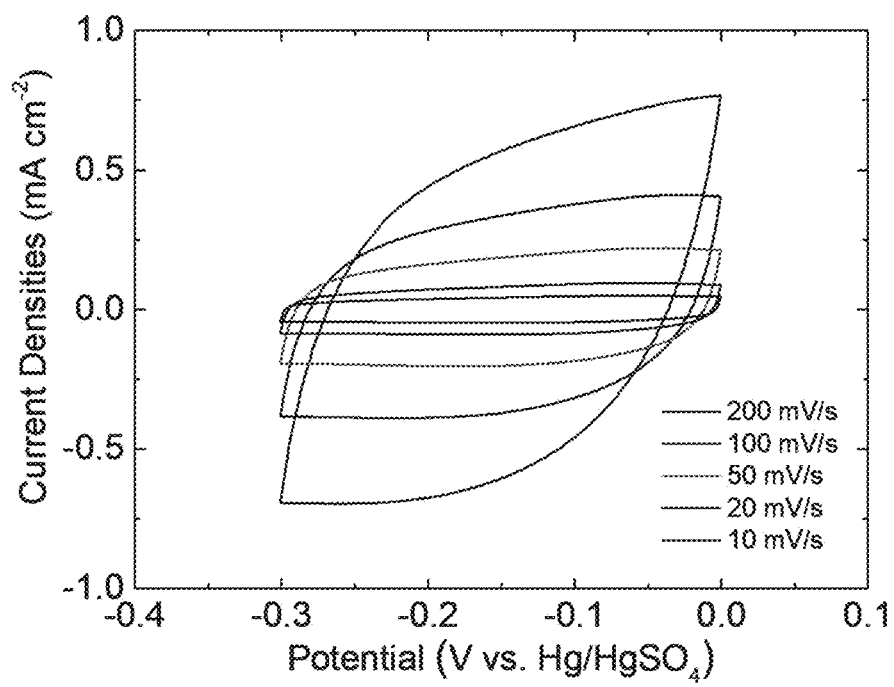
Figure 6:
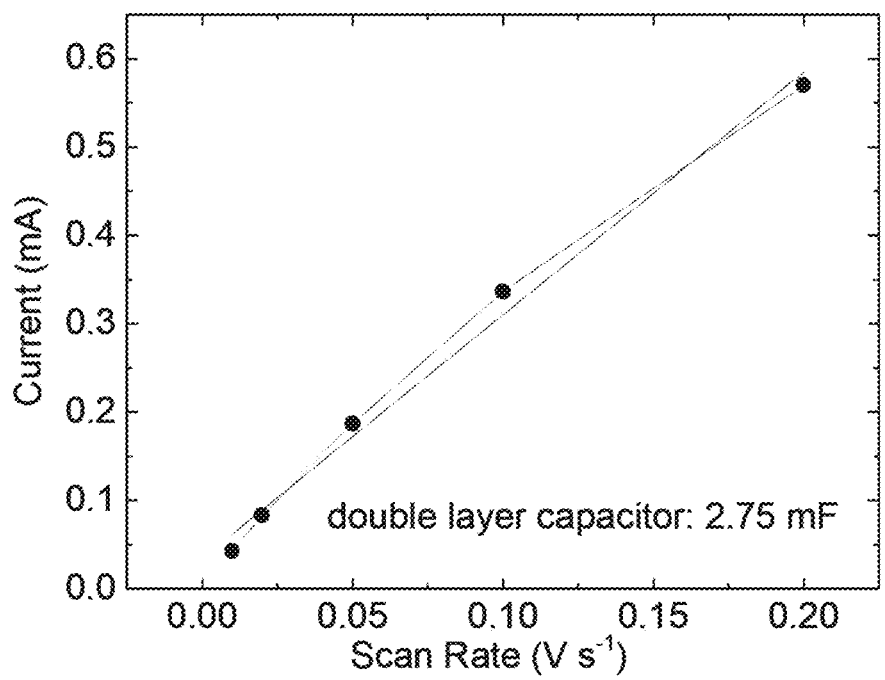

A piece of porous carbon paper with the same diameter as the glassy carbon electrode may be used as a thin diffusion layer, in order to serve as a conductive thin-layer diffusion matrix and hence to mitigate for the sluggish kinetic behaviour of polyoxometalates in aqueous solution that manifests due to their low diffusion coefficients. To obtain a quantitative analysis of these CV responses, the electrochemically-active area of this working electrode was calculated by the double layer capacitance method (see FIG. 6).

All the solutions were degassed with Ar for at least half an hour before CVs were collected.

Flow-Cell System for Reduction and Oxidation of $Li_6[P_2W_{18}O_{62}]$

Figure 2:
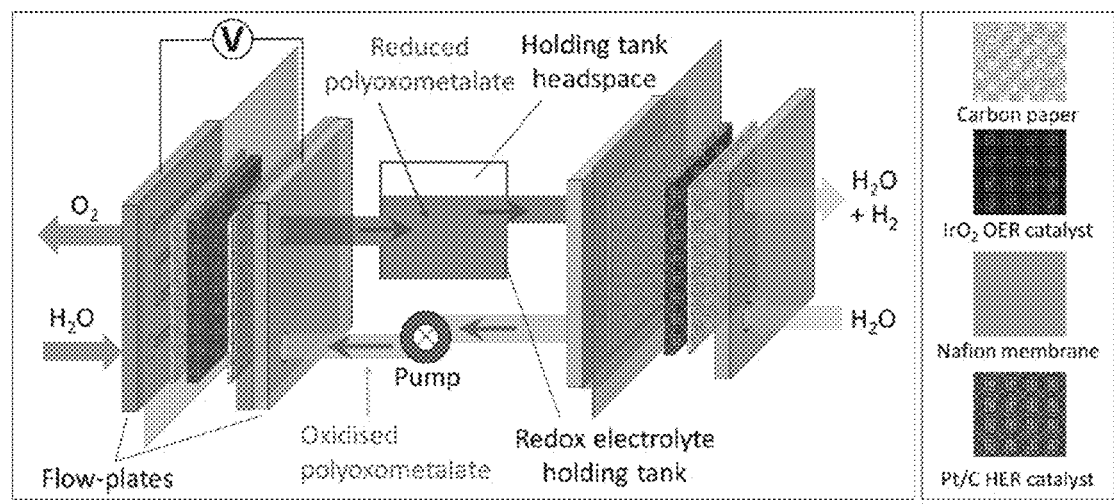
FIG. 2 shows (a) a schematic of two electrochemistry flow cells according to embodiments of the invention, for use in the reduction and oxidation of a mediator, such as the polyoxometalate $[P_2W_{18}O_{62}]^{6-}$. The flow cells differ in the location of the pump for circulation of material between the cells, and the second flow cell device having a reference electrode located on the flow channel for movement of the oxidised mediator between the cells; (b) the relationship between polyoxometalate $[P_2W_{18}O_{62}]^{6-}$ concentration (mM), solution pH (black filled circles) and the number of electrons that can be extracted from a reduced solution of the polyoxometalate (blue open circles). The number of electrons used to reduce the polyoxometalate was controlled at 18 per molecule (red dashed line); (c) the change in coulombic efficiency (%) and change in the number of electrons that can be extracted from a reduced solution of the polyoxometalate with change in the electrons input per polyoxometalate $[P_2W_{18}O_{62}]^{6-}$ cluster for theoretical (open circles), practical (blue filled circles) and efficient processes (purple filled); (d) a representative 18-electron reduction/re-oxidation cycle of a 50 mM solution of $[P_2W_{18}O_{62}]^{6-}$ showing the changes in potential (V against the NHE) with change in charge (C L$^{-1}$); and (e) shows the change in charge (C L$^{-1}$) and coulombic efficiency (%) with cycle number for 10 successive 18-electron reduction/re-oxidation cycles of a 50 mM solution of $[P_2W_{18}O_{62}]^{6-}$. In (d) and (e) a current density of ±50 mA cm$^{-2}$ was applied and 1 M $H_2SO_4$ was used as a supporting electrolyte.
Figure 2:
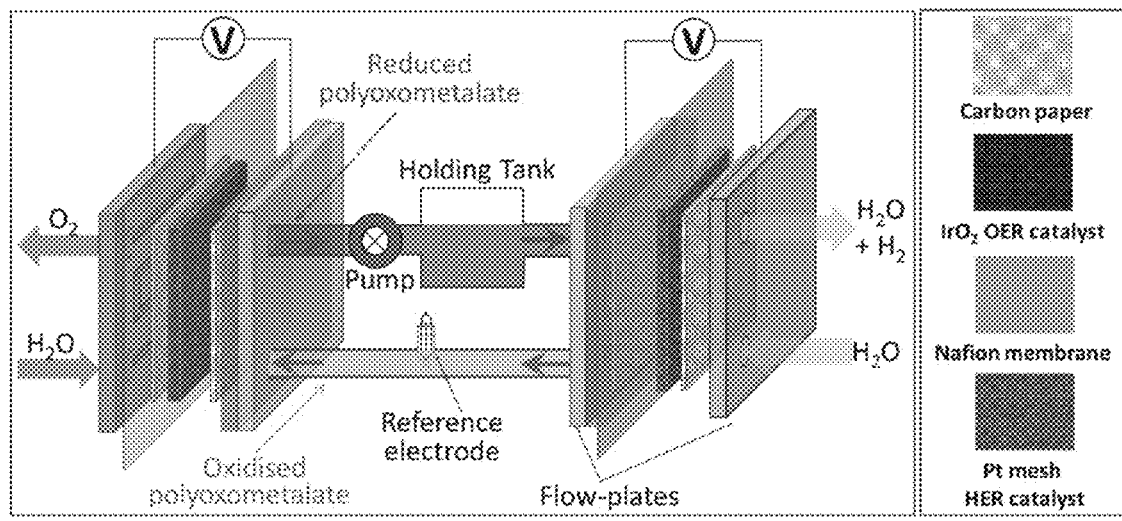
Figure 2:
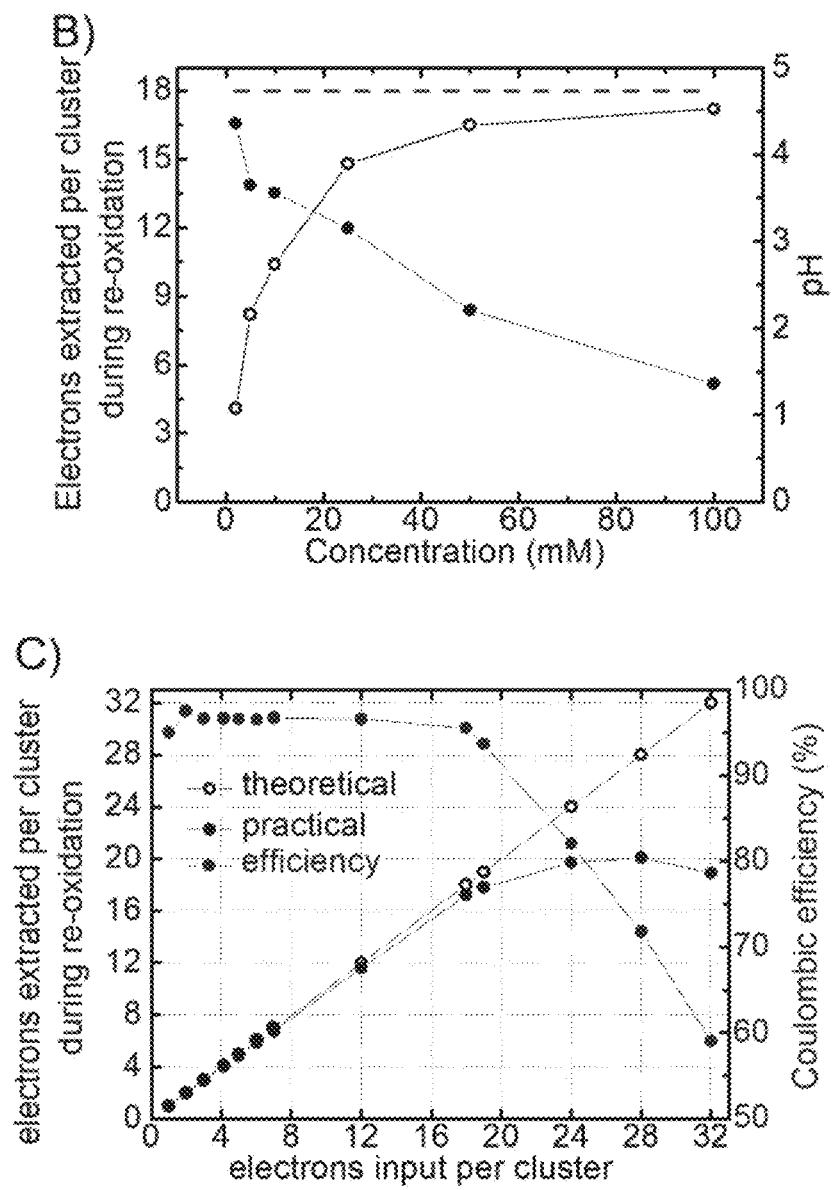
Figure 2:
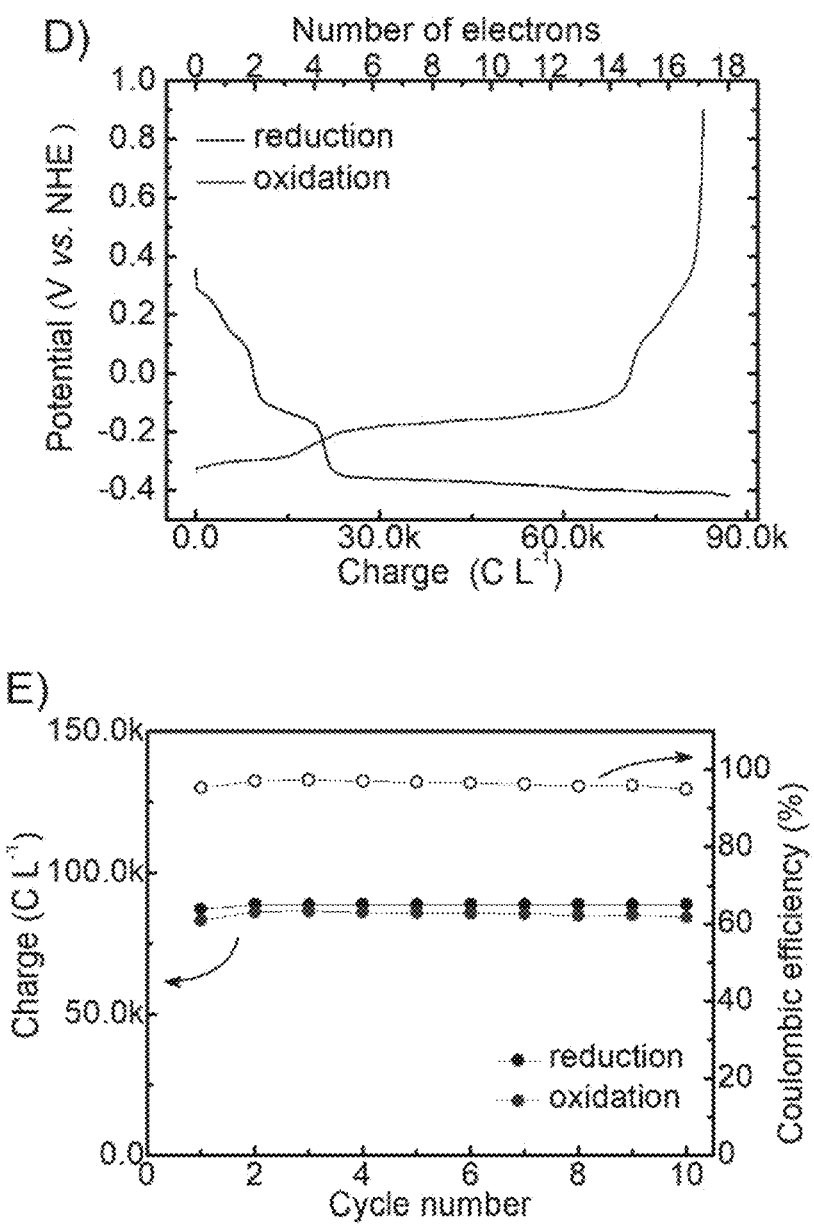

In view of the cyclic voltammetry results, electrochemical flow-cells (shown on the left-hand side of FIG. 2(a)) were constructed, in order to quantify the number of electrons that the polyoxometalate could store in a reversible fashion.

In such devices, water was oxidised on the iridium oxide catalyst (left-hand side of left-hand cell), producing 02, protons and electrons. These electrons and protons were used to reduce and protonate an aqueous solution of $[P_2W_{18}O_{62}]^{6-}$ on the right hand side of the cell, forming more reduced polyoxoanions ($[P_2W_{18}O_{62}]^{(6+n)-}$). In order to prevent parasitic hydrogen evolution, a carbon cathode was used for this reduction. The $[P_2W_{18}O_{62}]^{6-}$ solution was pumped through the cathode side at a rate of 100 mL min$^{-1}$ so as to minimise mass transport overpotentials. By recirculation of this polyoxometalate solution, it was then possible to generate polyoxometalate solutions that were reduced by specific amounts, simply by controlling the charge passed during the experiment. Once a desired amount of charge had been passed, the reduced polyoxometalate solution was then re-oxidised electrochemically on a carbon anode in a cell such as that shown on the right-hand side of FIG. 2(a). The charge stored reversibly in the polyoxometalate solution could then be gauged by comparing the charge originally used to reduce the polyoxometalate with the charge obtained when it was re-oxidised.

FIG. 2(b) then shows the relationship between the concentration of polyoxometalate in water, the resulting pH of that solution (note that these studies were conducted without any supporting electrolyte in the polyoxometalate solution), and the charge that can be stored reversibly in the polyoxometalate solution. In each case, the charge passed equated to that which would be expected (in the absence of other reactions) to bring about an 18-electron reduction of the polyoxometalate (red dashed line in FIG. 2(b)). Hence at low polyoxometalate concentrations (high pH), it is apparent that most of the charge passed during the reduction process cannot be extracted during oxidation of the polyoxometalate solution. For example, at a polyoxometalate concentration of 2 mM (pH 4.5), only a charge corresponding to 4 out of the 18 electrons per polyoxometalate molecule that were passed could be re-extracted during oxidation. At a higher concentration (5 mM, pH 3.5), the amount of charge that can be extracted increases to 8/18 electrons per molecule and at 50 mM (pH 2) this value is around 16/18 electrons. Analysis of the headspace of the polyoxometalate holding tank suggested that the charge that is "lost" in this way at high pH is consumed in hydrogen production (see Gas Chromatography section below). This is in agreement with the CV data (FIGS. 1(b) and (c)), which suggests that the storage of electrons in the polyoxometalate is proton-coupled, and that lower pH values should therefore stabilise more reduced species. At higher pH values the polyoxometalate can only be reduced by a small number of electrons, and so any charge over and above this that is passed into solution goes directly into reducing protons. FIG. 2(b) shows that at a polyoxometalate concentration of 100 mM (pH 1.3), 96% of the charge used during the reduction process can now be extracted by electrochemical re-oxidation of the polyoxometalate, implying that each polyoxometalate molecule is reversibly storing an average of 17.2 electrons under these conditions.

Flow-cells with low ohmic polarization resistances (~20 mΩ in the present case) are important for the efficient operation of this system because the reduction of the polyoxometalate anions happens at only slightly less cathodic potentials than hydrogen evolution (see FIG. 1). Hence, in the present case high flow rates of the polyoxometalate solution (100 mL min$^{-1}$) were employed in order to minimize mass transport overpotentials.

It was useful to use galvanostatic electrolysis methods, in order to control the current density so that the polyoxometalate could be reduced without causing excessive hydrogen evolution. Using traditional static electrochemical cells (i.e. without any continuous flow of electrolyte) lead to much higher resistances (usually at least several dozen ohms), which were found to be too high for the polarization potential to be sufficiently controlled when using galvanostatic methods.

Conversely, the use of potentiostatic methods in static electrochemical cells was found to lead to depletion of the polyoxometalate at the electrode and therefore gave rise to large hydrogen evolution currents. Hence flow-cells seem essential if excessive hydrogen evolution is to be avoided when performing the reduction of $[P_2W_{18}O_{62}]^{6-}$ by more than around 6 electrons.

Figure 5:
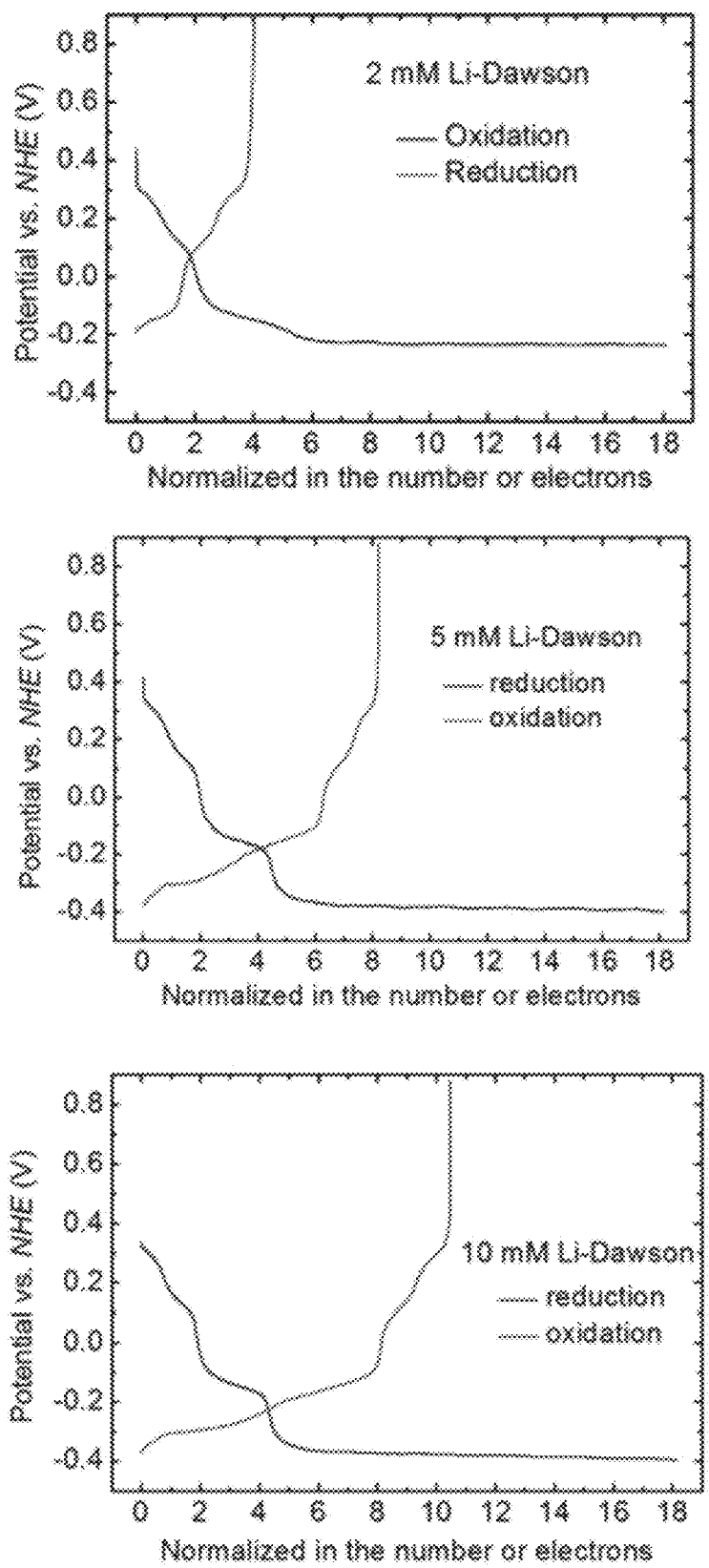
FIG. 5 shows reduction-oxidation curves at different concentrations where change in potential (V against NHE) is shown with the change in the normalized number of electrons for the oxidation (red) and reduction (black) of $Li_6[P_2W_{18}O_{62}]$ at different concentrations (2 to 100 mM of polyoxometalate) under the conditions set out in Table 1. These experiments were performed under an atmosphere of Ar.
Figure 5:
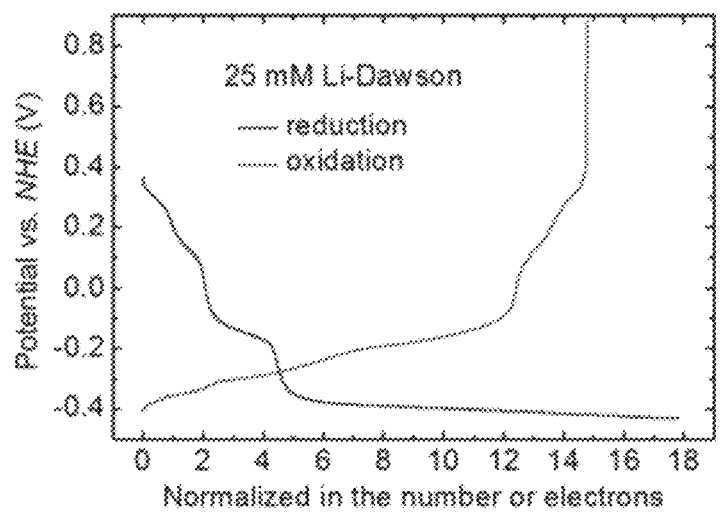
Figure 5:
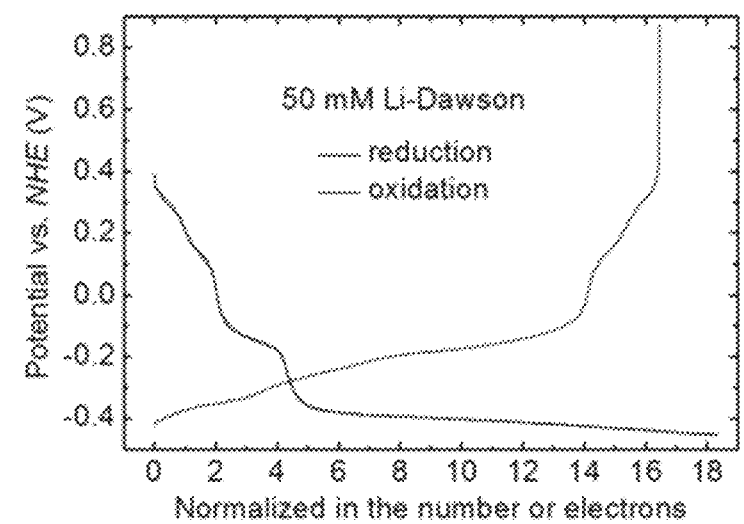
Figure 5:
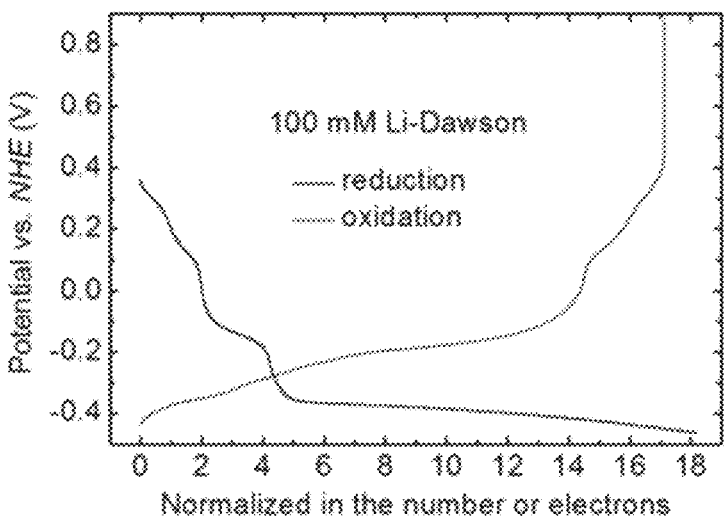

Table 1 below provides a comparison of the number of electrons that can be stored in $Li_6[P_2W_{18}O_{62}]$ at different concentrations in $H_2O$. In all cases, the number of electrons used to initially reduce the $Li_6[P_2W_{18}O_{62}]$ was set at 18 per polyoxometalate molecule. Reduction oxidation curves at different concentrations corresponding to the data from Table 1 are shown in FIG. 5.

TABLE 1

Comparison of the number of electrons that can be stored in $Li_6[P_2W_{18}O_{62}]$

| Conc. $Li_6[P_2W_{18}O_{62}]$ (mM) | 2 | 5 | 10 | 25 | 50 | 100 |
|---|---|---|---|---|---|---|
| Volume (mL) | 25 | 25 | 25 | 25 | 25 | 25 |
| Current density (mA cm$^{-2}$) | 2 | 5 | 10 | 25 | 50 | 50 |
| Coulombic efficiency (%) | 22.2 | 45.3 | 57.8 | 82.8 | 89.9 | 94.3 |
| Number of electrons stored per cluster | 4.0 | 8.2 | 10.4 | 14.8 | 16.5 | 17.2 |

FIG. 2(c) shows the relationship between the amount of charge passed during reduction of a 100 mM polyoxometalate solution at pH 1.3 (quoted in electrons input per polyoxometalate cluster), and the amount of charge that could be extracted from the reduced solutions by electrochemical re-oxidation in the set-up shown in FIG. 2(a). This shows that the coulombic efficiency of polyoxometalate reduction and re-oxidation remains at or above 95% up to a reduction level of 18 electrons per polyoxometalate molecule (see also FIGS. 10 to 13). When more charge than this is applied during reduction under these conditions, the coulombic efficiency of the re-oxidation process falls off, most likely due to increased parasitic losses to hydrogen production. The maximum number of electrons that can be stored reversibly in the polyoxometalate under these conditions appears to be 20 per polyoxometalate molecule, although there are considerable parasitic losses at this maximum value. Hence 18 electrons are considered as the maximum number of electrons that can be stored per polyoxometalate molecule under these conditions without appreciable losses to other processes.

The stability of $[P_2W_{18}O_{62}]^{6-}$ to reduction by 18 electrons to $[P_2W_{18}O_{62}]^{24-}$ was probed electrochemically in FIGS. 2(d) and (e). FIG. 2(d) shows a typical galvanostatic reduction/re-oxidation cycle for $[P_2W_{18}O_{62}]^{6-}$, whilst FIG. 2(e) shows that the coulombic efficiency of this process is maintained at a value above 95% over multiple cycles. Gas chromatography was performed on the headspace of the polyoxometalate holding tank during these experiments and showed that there is very limited production of hydrogen under these conditions (see Gas Chromatography section below). Moreover, high resolution mass spectrometry analysis of a 100 mM solution of $[P_2W_{18}O_{62}]^{6-}$ after such redox cycling served as further evidence that the polyoxometalate is stable under these conditions (see Mass Spectrometry section below).

Generally, the flow cell system comprised a mixture of commercially available and custom-made components. The electrodes undertaking reduction and oxidation of solutions of $Li_6[P_2W_{18}O_{62}]$ were assembled as follows. POCO graphite plates (thickness 3 mm, channel width=0.16 cm, channel depth=0.2 cm, landing between channels=0.08 cm) were supplied by balticFuelCells GmbH and were pre-treated by heating with $HNO_3$ at 80° C. for 1 h. Three layers of Toray carbon paper (TCP-H-60, supplied by Fuel Cell Etc.) were pre-treated by soaking in $H_2SO_4$:$HNO_3$, 3:1 v/v, for 3 h. These components were used as the electrodes for reduction and oxidation of solutions of $Li_6[P_2W_{18}O_{62}]$. Stainless steel plates were used as the current collectors on this side of the cell.

The Nafion membrane was pre-treated according to previously published protocols (see Wang et al.). Nafion films were boiled in 3% $H_2O_2$ at 80° C., washed with distilled water, immersed in 1 M $H_2SO_4$ at 80° C., and finally washed with distilled water. Each step was 1 hour long.

The electrodes performing the oxygen and hydrogen evolution reactions were prepared as follows. One layer of Toray carbon paper and an iridium oxide-coated membrane (Nafion 115, one side coated, supplied by Ion Power) was used as the oxygen evolution reaction catalyst and a Pt mesh was used for the hydrogen evolution reaction (here, one layer of Toray carbon may be used with Pt mesh). The current collectors for these were 12.96 cm² Ti blocks with interdigitated flow channels (thickness 3 mm, channel width=0.16 cm, channel depth=0.2 cm, landing between channels=0.08 cm) supplied by balticFuelCells GmbH.

Flow cell endplates were machined from metallic aluminium and PTFE for both sides of the flow cells. Eight bolts (M6×60 mm Full Thread Hexagon Bolts, RS-Components, UK) were tightened to a torque of 6 Nm to complete the cell assembly, and PTFE tubing was used to transport electrolyte into and out of the flow cell. Peristaltic pumps were used to circulate the fluids at a rate of 100 mL min$^{-1}$. All the electrochemical data were collected using a Biologic SP-150 potentiostat with a modular booster unit (20 A). Redox reactions were then performed whilst keeping the polyoxometalate solution under an atmosphere of Ar.

Such a device has a very low ohmic polarization resistance of only around 20 mΩ. The high-speed circulating fluids minimise the mass transport overpotentials inherent with such polyoxometalates. Since the reduction of these polyoxometalate anions happens at only slightly less cathodic potentials than hydrogen evolution, a galvanostatic electrolysis method with a suitable current density was applied to reduce the polyoxometalate solution without causing excessive hydrogen evolution. Conventional (static) electrochemical cells with potentiostatic methods were found to lead to depletion of the polyoxometalate at the electrode and therefore gave rise to large hydrogen evolution currents. Meanwhile, static electrochemical cells with galvanostatic methods had resistances that were too high (usually at least several dozen ohms) for the polarization potential to be sufficiently controlled. The voltage plateaus in the potential vs. charge curves during the reduction (and oxidation) processes correspond to the thermodynamic potentials for the different redox reactions of the polyoxometalates.

Hydrogen Generation Reactions

Given that $[P_2W_{18}O_{62}]^{6-}$ can be reversibly reduced to give $[P_2W_{18}O_{62}]^{24-}$ with high coulombic efficiency, the performance of this highly-reduced polyoxometalate was assessed as a vector for on-demand hydrogen generation.

Accordingly, a 100 mM solution of $[P_2W_{18}O_{62}]^{24-}$ was prepared using the apparatus on the left-hand side of FIG. 2(a). This time, however, the polyoxometalate was not re-oxidised electrochemically, but instead exposed to Pt/C to investigate if hydrogen would spontaneously evolve from this reduced polyoxometalate in the presence of a suitable.

The apparatus for the experiment typically comprised a three-necked round-bottom flask having an addition flask held in its central neck, and a gas vent at a second neck which was connected to an inverted measuring cylinder placed in a water bath. The third neck was stoppered.

The reduced polyoxometalate mediator (prepared in a flow cell as on the left of FIG. 2(a) as described above, and then extracted from the holding tank under Ar) was placed in the addition flask, and then allowed to flow into the round-bottom flask containing a Pt/C catalyst (with stirring of the mixture). Hydrogen was rapidly evolved and measured in the measuring cylinder by displacement of water.

Figure 9:
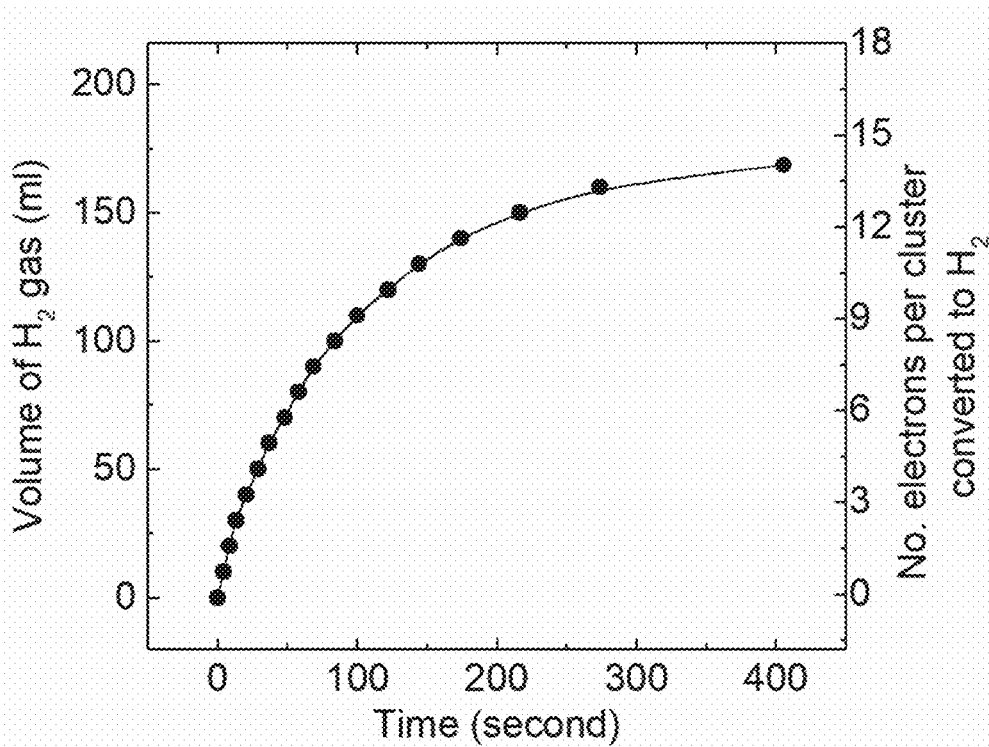
FIG. 9 shows the change in hydrogen production over time from a 10 mL sample of 0.1 M 18-electron reduced polyoxometalate solution under an argon atmosphere in the presence of 10 mg Pt/C catalyst (1% Pt by weight).]
Figure 10:
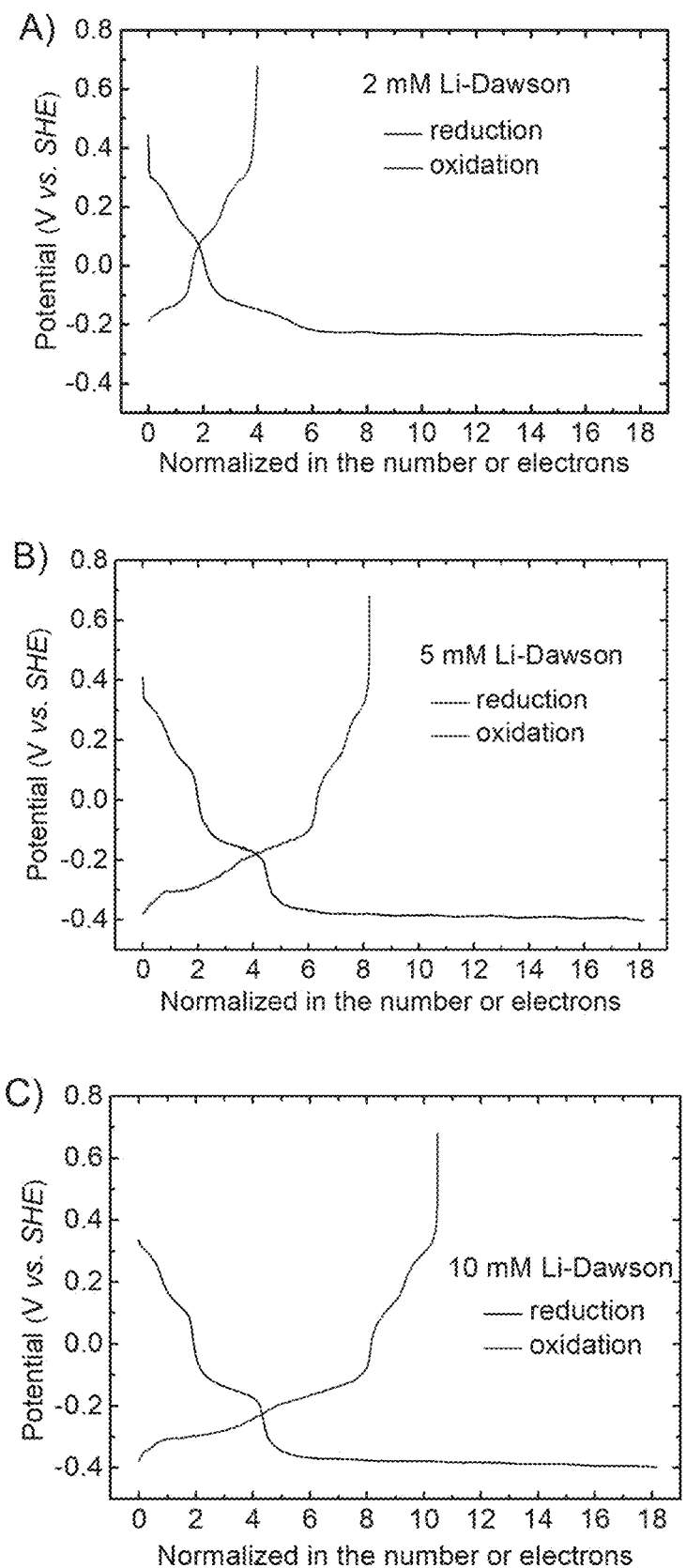
FIG. 10 shows reduction-oxidation curves at different concentrations corresponding to the data in Table 1 (thus, at concentrations at 2, 5, 10, 25, 50 and 100 mM). The charges on the x-axes have been converted to a number of electrons per polyoxometalate anion present. These experiments were performed under an atmosphere of Ar.
Figure 10:
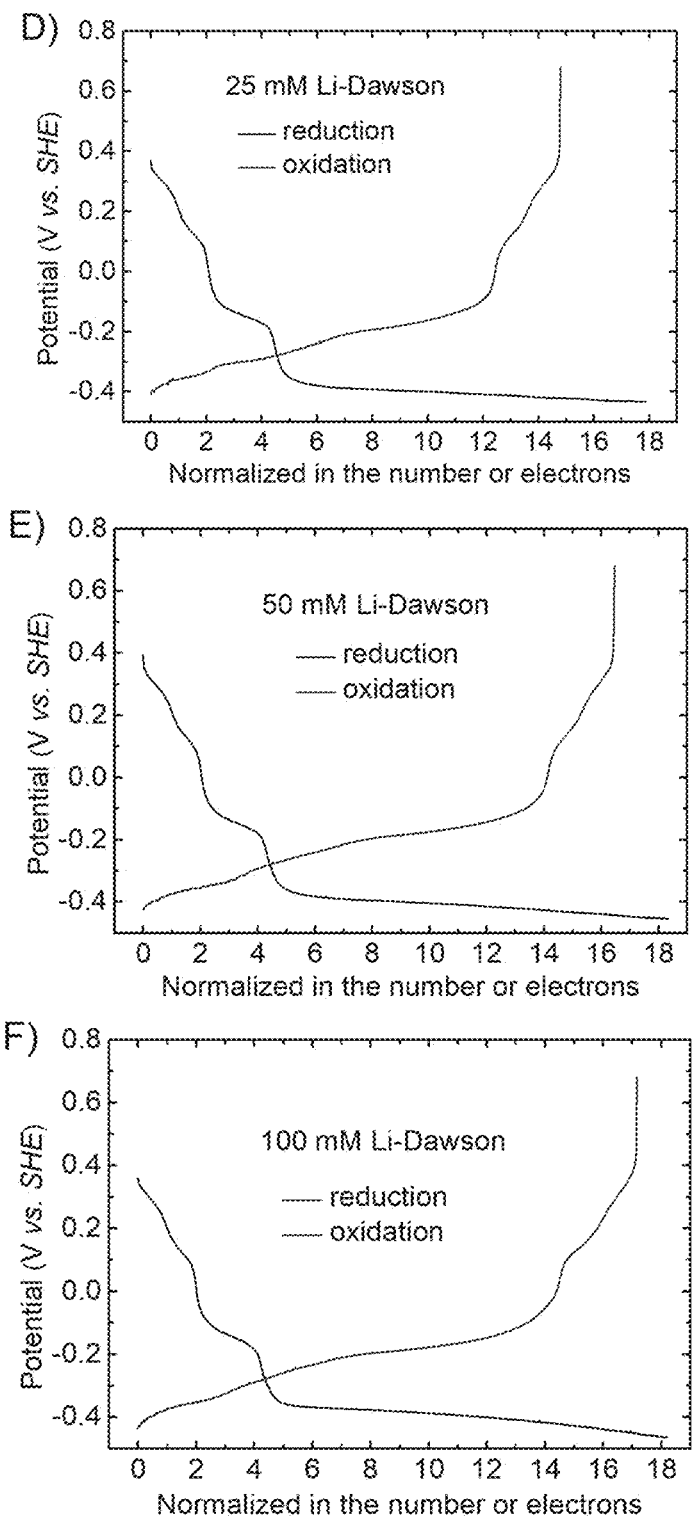
Figure 11:
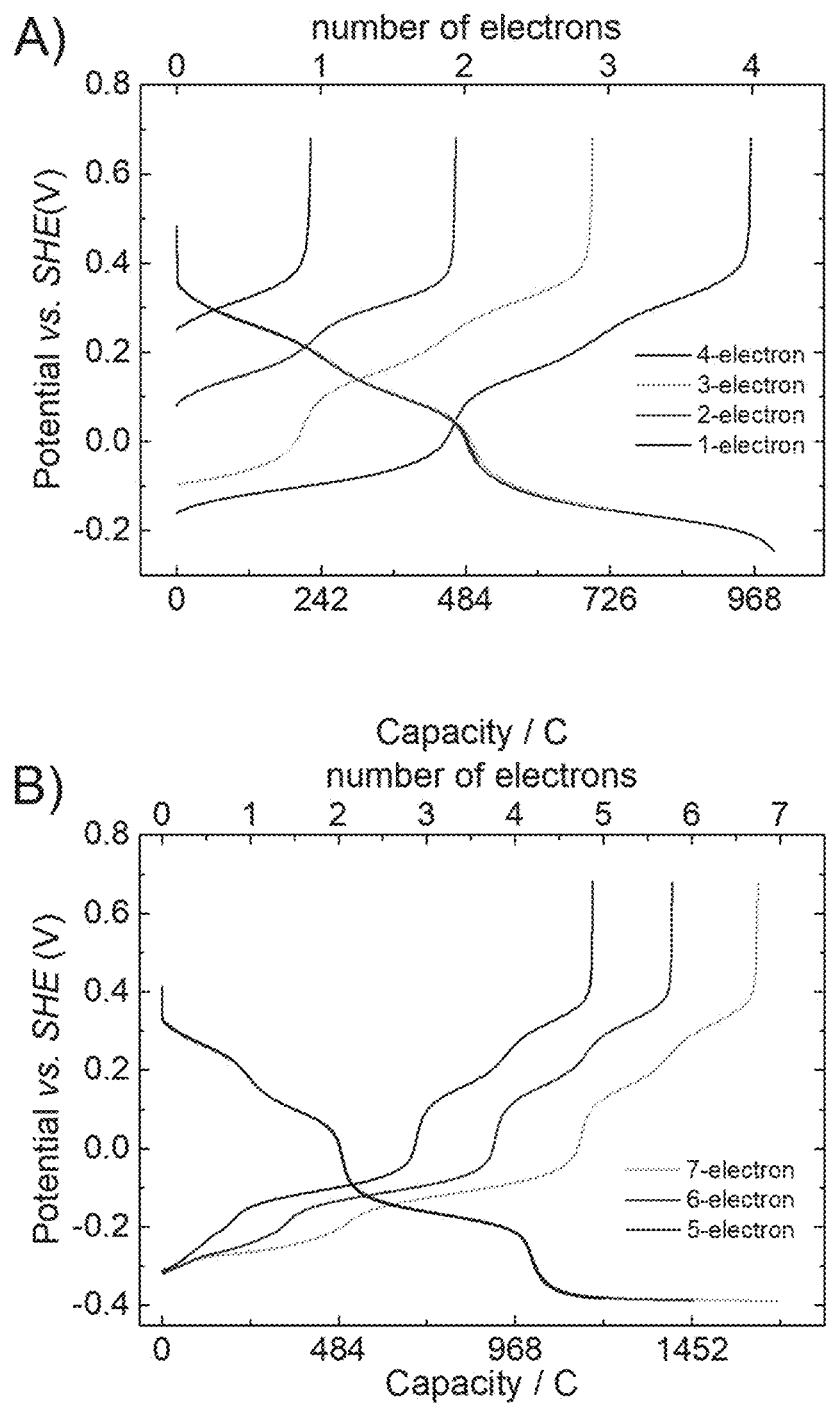
FIG. 11 shows the reduction-oxidation curves of 25 mL of a 100 mM solution of $[P_2W_{18}O_{62}]^{6-}$ in $H_2O$, showing oxidation/reduction by various numbers of electrons. The charges on the X-axes have been converted to a number of electrons per polyoxometalate anion present
Figure 11:
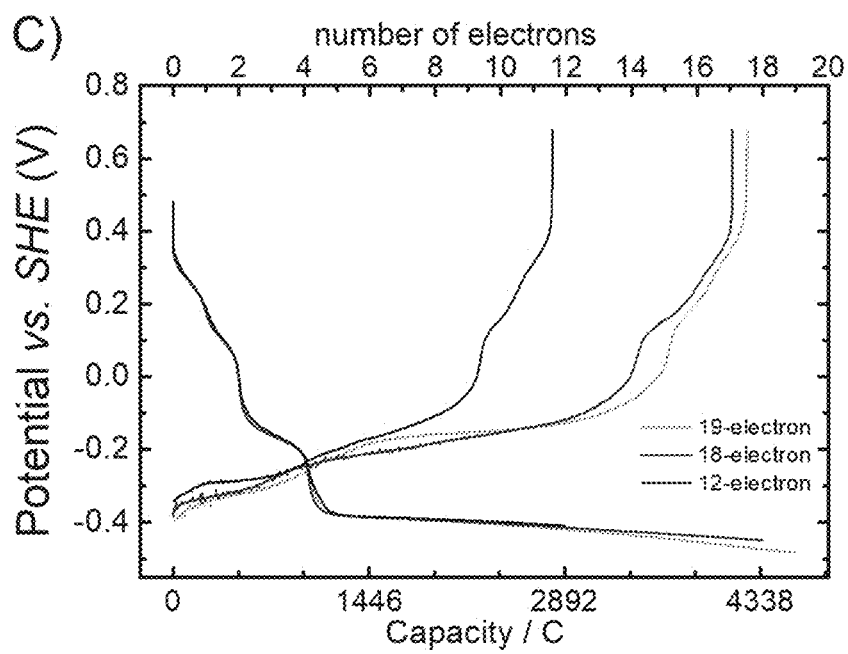
Figure 12:
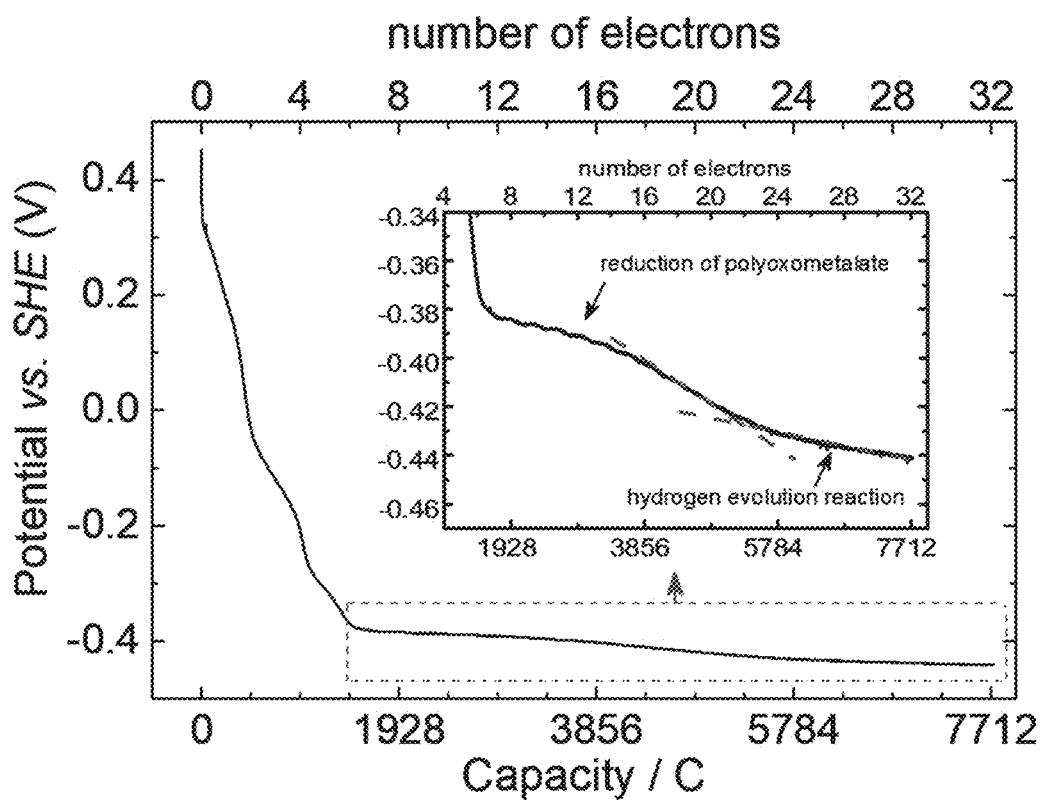
FIG. 12 shows the 32-electron reduction curve of 25 mL of a 100 mM solution of $[P_2W_{18}O_{62}]^{6-}$. The inset for the reduction curve shows where appreciable hydrogen evolution begins.
Figure 13:
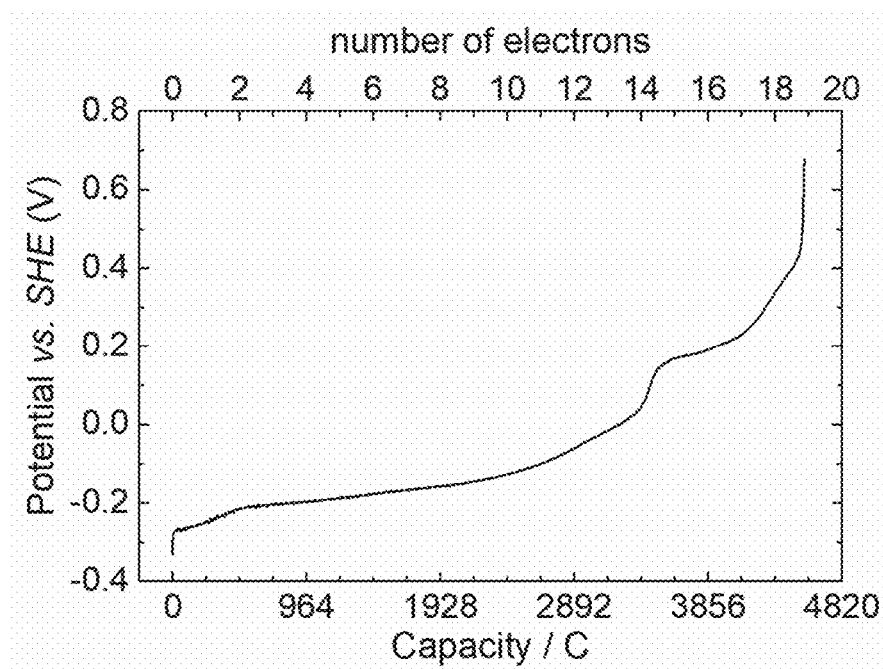
FIG. 13 shows the corresponding re-oxidation curve of the reduction process set out in FIG. 12.

FIG. 9 relates the amount of hydrogen that is evolved to the number of electrons used to reduce the polyoxometalate initially: after 400 s, around 14 of the initial 18 electrons (per polyoxometalate anion) are recovered as hydrogen, and hydrogen evolution is still ongoing (albeit at a much slower rate than initially). Given that FIG. 1 shows that the final two re-oxidation potentials of the reduced polyoxometalate are anodic of the reversible hydrogen potential (0 V vs. SHE), then contact with Pt/C would only ever be expected to yield hydrogen until the two-electron reduced species was reached. Hydrogen evolution would then be expected to cease, leaving a two-electron-reduced anion, $[P_2W_{18}O_{62}]^{8-}$ (with appropriate charge-balancing cations). Hence, under these conditions, 16 is the maximum number of electrons that can be obtained as hydrogen spontaneously by contacting the reduced polyoxometalate with Pt/C, in very good agreement with the data in FIG. 9.

Figure 3:
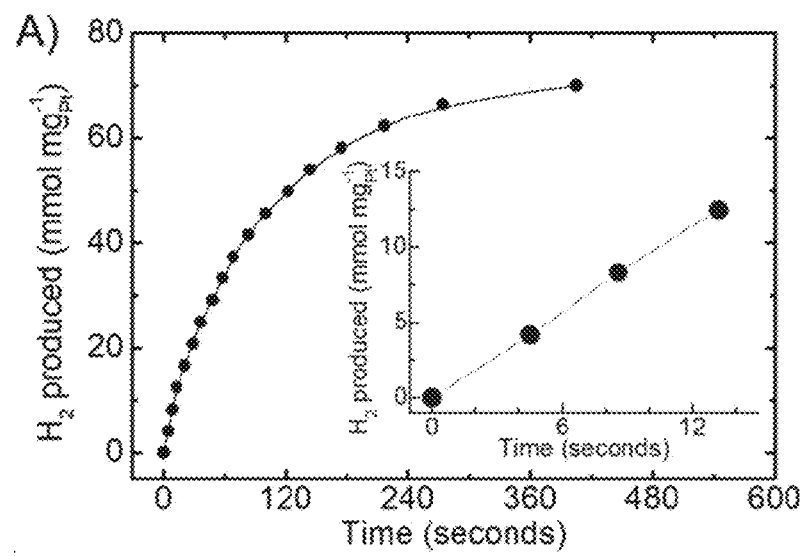
FIG. 3 shows the results from experiments relating to the production on demand from solutions of reduced polyoxometalate, where (a) shows the change in hydrogen production (mmol mg$^{-1}$ Pt) over time (s) from a 10 mL sample of 0.1 M 18-electron reduced polyoxometalate solution (reduced version of $[P_2W_{18}O_{62}]^{6-}$) under an argon atmosphere in the presence of 10 mg Pt/C catalyst (1% Pt by weight); and (b) shows the change in volume of hydrogen produced and the change in the number of electrons per cluster converted to hydrogen with change in time (h) for a 0.5 mL sample of 50 mM 18-electron reduced polyoxometalate solution diluted with 1 M $Li_2SO_4$ (pH=7), $H_2O$ (pH=4.4), 50 mM $H_2SO_4$ (pH=1.5) and 1 M $H_2SO_4$ (pH=1.0).
Figure 3:
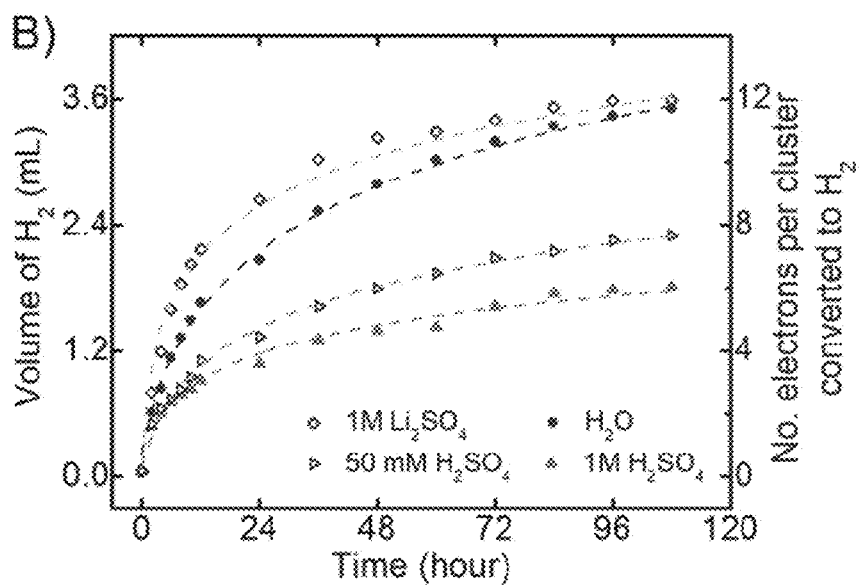

FIG. 3(a) shows the rate at which hydrogen is evolved under these conditions. An initial rate of 3,500 mmol of hydrogen per hour per mg of Pt is achieved (inset to FIG. 3(a)), which is a significantly higher rate per mg of Pt than that achieved in conventional proton exchange membrane electrolysers (where rates in state-of-the-art systems are on the order of 50-100 mmol of hydrogen per hour per mg of Pt; see Millet et al., and Xu et al.).

As discussed above, the ability to reduce $[P_2W_{18}O_{62}]^{6-}$ is strongly linked to both the pH and the concentration of the cluster in the reaction medium. This leads to intriguing behaviour if the pH of a solution of more highly reduced polyoxometalate is altered. This is shown in FIG. 3(b), where 50 mM solutions of $[P_2W_{18}O_{62}]^{6-}$ (pH 2) were first reduced by 16 electrons per polyoxometalate molecule, before then being diluted to a final concentration of 2 mM with various solutions. When this dilution is carried out with water (red circles), the effect is to raise the solution pH to around 4.5, at which value FIG. 2(b) suggests that the polyoxometalate is unstable with respect to much less reduced species and hydrogen. Indeed, when 50 mM solutions of the reduced polyoxometalate are diluted in this way, hydrogen gas is observed to evolve spontaneously (albeit slowly) from the solution until the cluster is reduced by only 6 electrons (as confirmed by coulometry) without the need for any catalyst (see Gas Chromatography section below). A similar effect is seen when the dilution is undertaken with a non-buffering electrolyte which still allows the pH to rise ($Li_2SO_4$, black diamonds in FIG. 3(b)). Meanwhile, dilution with acidic media (to pH 1.5 and pH 1, blue and green triangles respectively) also leads to a limited amount of spontaneous hydrogen evolution, suggesting that merely reducing the concentration of the highly-reduced polyoxometalate has an effect on its stability. This serves as further evidence that the reduction capacity of $[P_2W_{18}O_{62}]^{6-}$ is both concentration and proton-dependent, and shows that spontaneous hydrogen evolution from solutions of $[P_2W_{18}O_{62}]^{(n+6)-}$ can be achieved without the need for an electrochemical bias, either by exposure to an appropriate catalyst (FIG. 3(a)) or by simply diluting the solution (FIG. 3(b)).

The ability of $Li_6[P_2W_{18}O_{62}]$ to accept reversibly 18 electrons and protons corresponds to ca. 1.8 g of hydrogen $L^{-1}$ at room temperature at a concentration of 0.1 M. Extrapolating to the limits of the solubility of this polyoxometalate (1.9 M $L^{-1}$ in aqueous solution at 80° C.), an effective storage potential of 34.2 g $H_2$ $L^{-1}$ at 360 K could be achieved, which compares with pure cryogenic liquid hydrogen (71 g $H_2$ $L^{-1}$ at 20 K).

Redox Flow Battery

As $[P_2W_{18}O_{62}]^{6-}$ can reversibly store many electrons in a reversible fashion, its ability to act as an energy storage vector in its own right as the electrolyte in a redox flow battery was also investigated.

Figure 4:
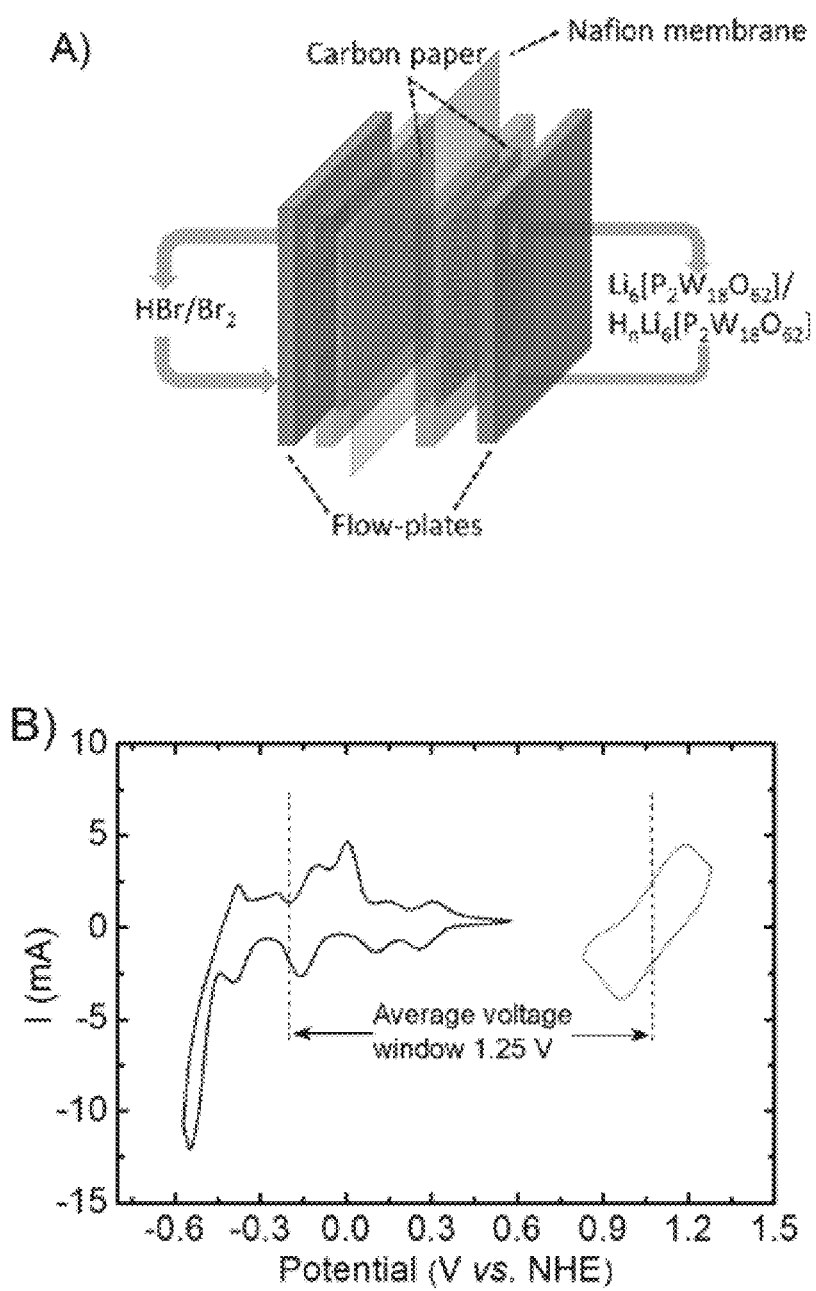
FIG. 4 shows (a) a redox flow cell according to an embodiment of the present invention for use in the reduction and oxidation of a mediator, such as the polyoxometalate $[P_2W_{18}O_{62}]^{6-}$; (b) cyclic voltammograms (CVs) of $Li_6[P_2W_{18}O_{62}]$ (blue) and HBr (orange) under the conditions in the flow cell, where change in current (mA) is shown with change in potential (V against NHE); (c) shows the change in cell voltage (V) with change in capacity density (Ah L$^{-1}$) with different concentrations of $Li_6[P_2W_{18}O_{62}]$ in aqueous solution (0.1 M red line; 0.3 M blue line; and 0.5 M black line) on the negative side of the flow cell, and 4 M HBr together with 0.1 M $Br_2$ in aqueous solution on the positive side at a current density of 50 mA cm$^{-2}$ at 20° C.; (d) polarization curves where the change in cell voltage (V) and the change in power density (W cm$^{-2}$) is shown with change in current density (A cm') at 20° C. at 100% state-of-charge (OCV=open circuit voltage) for different concentrations of $Li_6[P_2W_{18}O_{62}]$ in aqueous solution (0.1 M black line; 0.3 M red line; and 0.5 M blue line); (e) the change in capacity density (Ah L$^{-1}$) and change in coulombic efficiency (%) with change in cycle number, obtained by applying a constant current of 0.1 A cm$^{-2}$ over the voltage range 0-1.65 V at 20° C., in a cell having 0.1 M $Li_6[P_2W_{18}O_{62}]$ in 1 M $H_2SO_4$ on the negative side of the cell, and 4 M HBr together with 0.1 M $Br_2$ in aqueous solution on the positive side; and (f) shows the relationship between energy density and concentration of $Li_6[P_2W_{18}O_{62}]$ in a redox flow battery and (g) shows the discharge capacity density and coulombic efficiency vs. cycle number obtained by applying a constant current of 0.1 A cm$^{-2}$ over the voltage window 0-1.65 V at 20° C., using 4 M HBr+0.1 M $Br_2$ on the positive side and 0.5 M $Li_6[P_2W_{18}O_{62}]$ in 0.1 M $H_2SO_4$ on the negative side.
Figure 4:
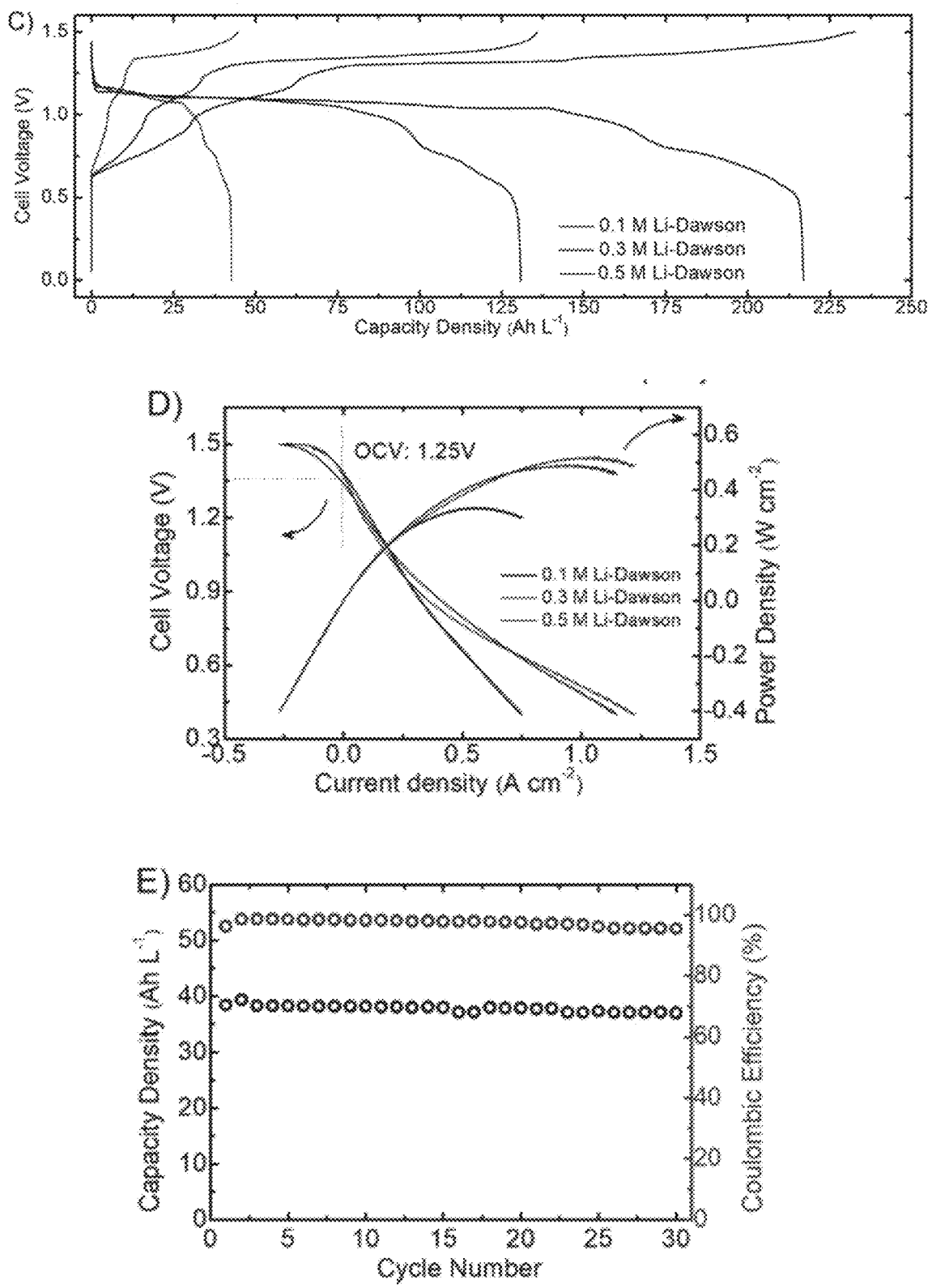
Figure 4:
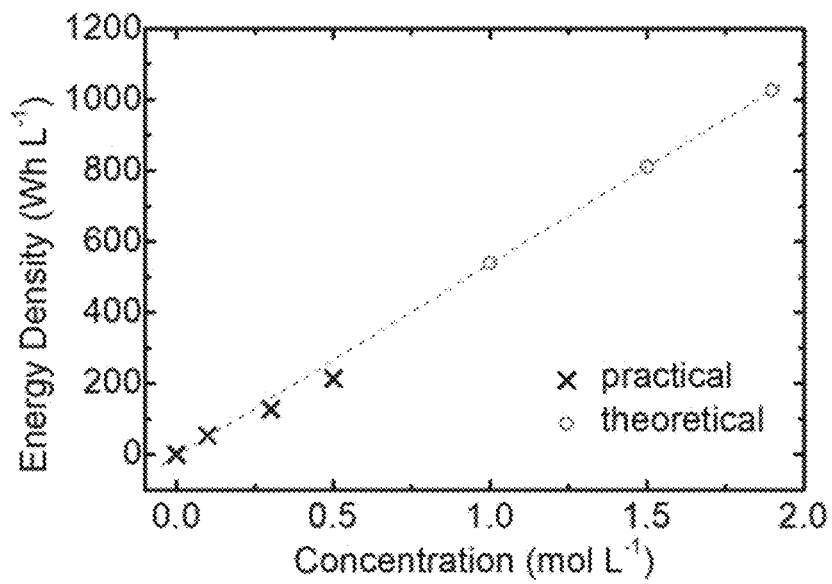
Figure 4:
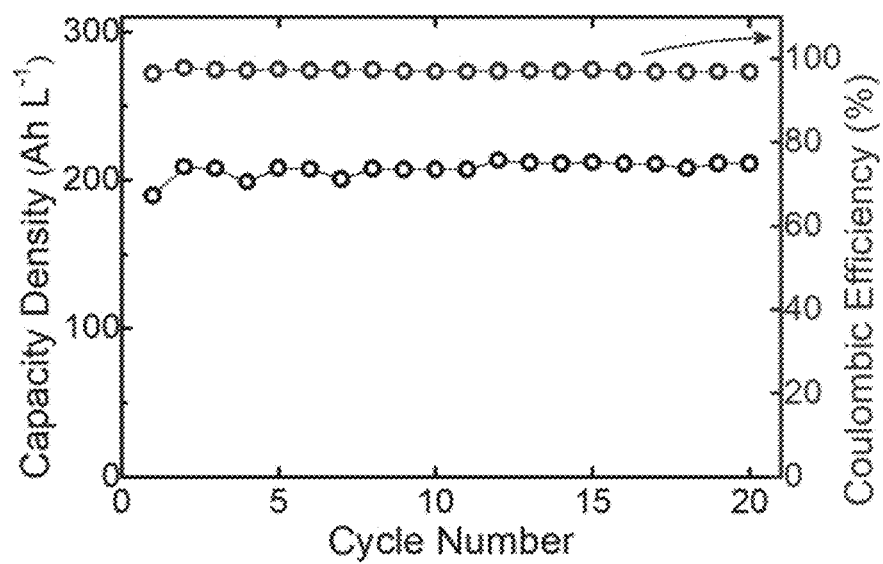

Accordingly, the flow-cell shown in FIG. 4(a) was constructed, where aqueous solutions of $Li_6[P_2W_{18}O_{62}]$ (in 1 M $H_2SO_4$ when at concentrations of 0.1 M and 0.3 M, and in water when at a concentration of 0.5 M) were used as the negative side electrolyte, and HBr was used on the positive side. FIG. 4(b) shows the redox processes associated with these species and suggests that output voltages well in excess of a volt should be achievable with such a system. FIG. 4(c) shows that as the concentration of $Li_6[P_2W_{18}O_{62}]$ is increased, the capacity density also increases, reaching a maximum value of 217 Ah $L^{-1}$ at a concentration of 0.5 M (at a current density of 50 mA $cm^{-2}$), corresponding to an energy density of 213 Wh $L^{-1}$, with an average operating voltage in excess of 1 V.

Figure 7:
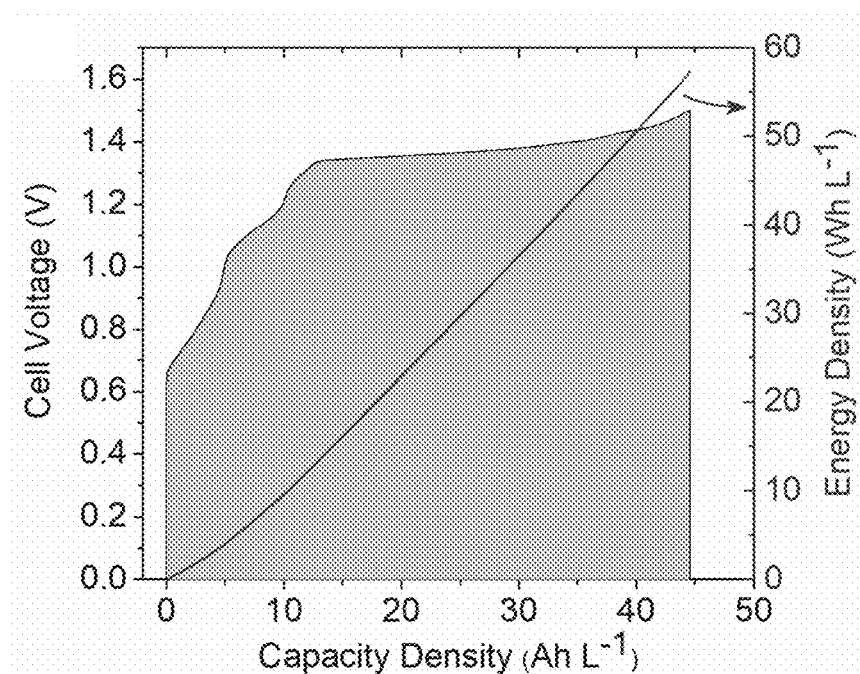
Figure 7:
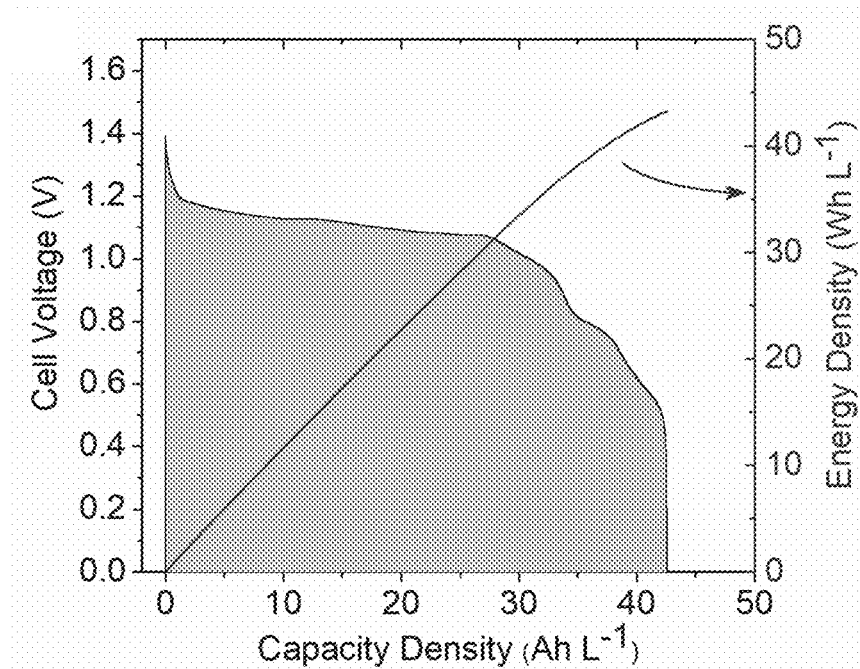
Figure 7:
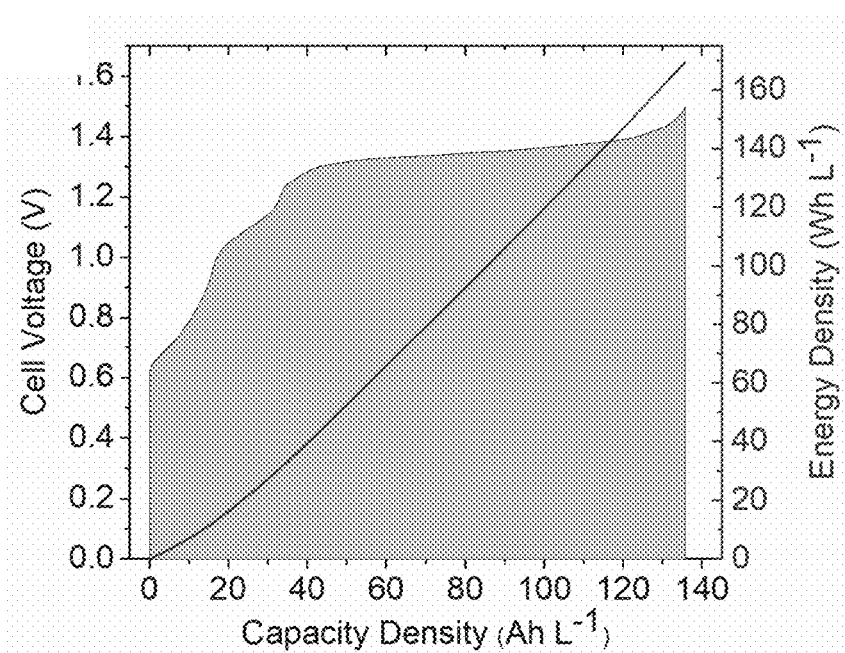
Figure 7:
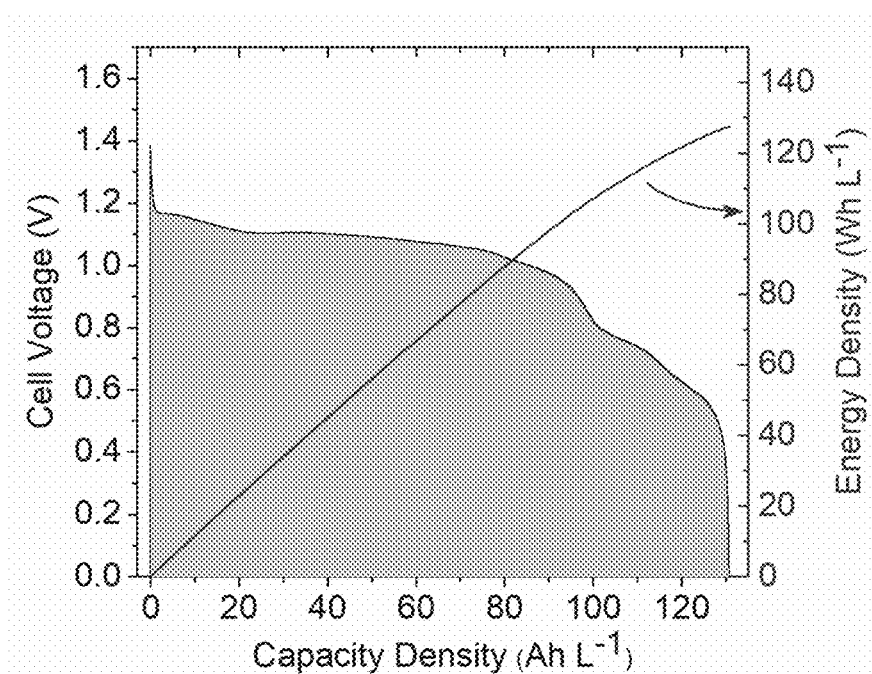
Figure 7:
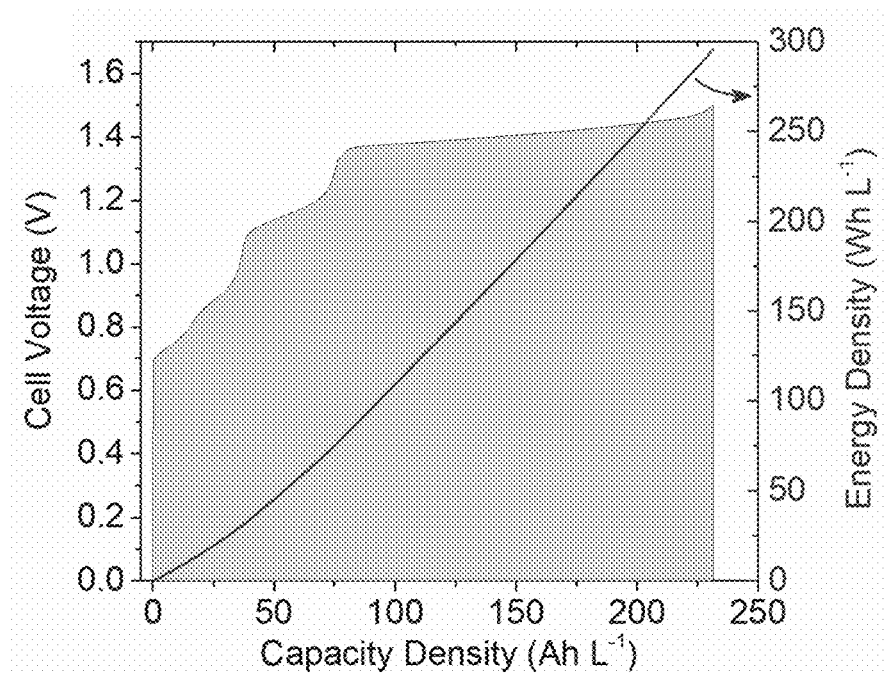
Figure 7:
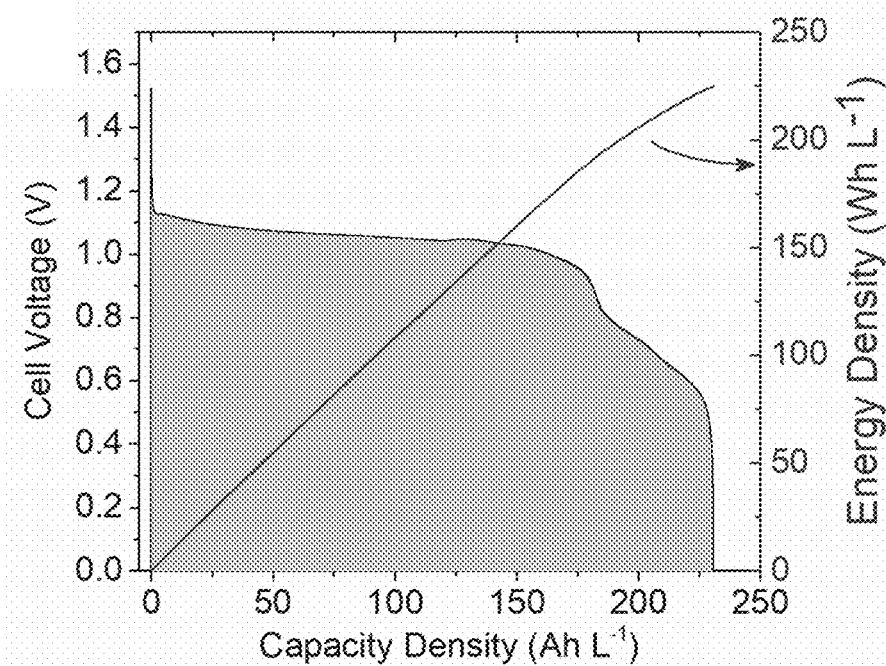

When this work was repeated, at 0.3 M and 0.5 M capacities of 131 Ah $L^{-1}$ and 230 Ah $L^{-1}$ respectively were achieved at 20° C., corresponding to practical energy densities of 130 Wh $L^{-1}$ and 225 Wh $L^{-1}$ respectively, see FIG. 4(c). Meanwhile, the energy efficiency at each of these concentrations is 76% (see FIG. 7).

These results are interesting since they show that this system, at the solubility limit of the cluster, would yield a flow battery with an energy density more than 1,000 Wh $L^{-1}$, as shown in FIG. 4(f).

The polarization curves (FIG. 4(d)) exhibit a peak galvanic power density of 0.52 W cm' at a concentration of $Li_6[P_2W_{18}O_{62}]$ of 0.3 M at 20° C., which falls off slightly at higher concentrations due to the increased viscosity of the solution. FIG. 4(e) then shows cycling data for this redox flow battery containing 0.1 M $Li_6[P_2W_{18}O_{62}]$ at a current density of 0.1 A $cm^{-2}$ over the voltage range 0-1.65 V. The discharge capacity density is highly reproducible over 30 cycles with a coulombic efficiency of 98%.

FIG. 4(g) shows cycling data for this redox flow battery with 0.5 M $Li_6[P_2W_{18}O_{62}]$ at 0.1 A $cm^{-2}$ within the voltage cut-offs of 0 V and 1.65 V. The galvanic discharge capacity during cycling is highly stable at around 210 Ah $L^{-1}$ over 20 cycles with a coulombic efficiency of 98%.

Figure 8:
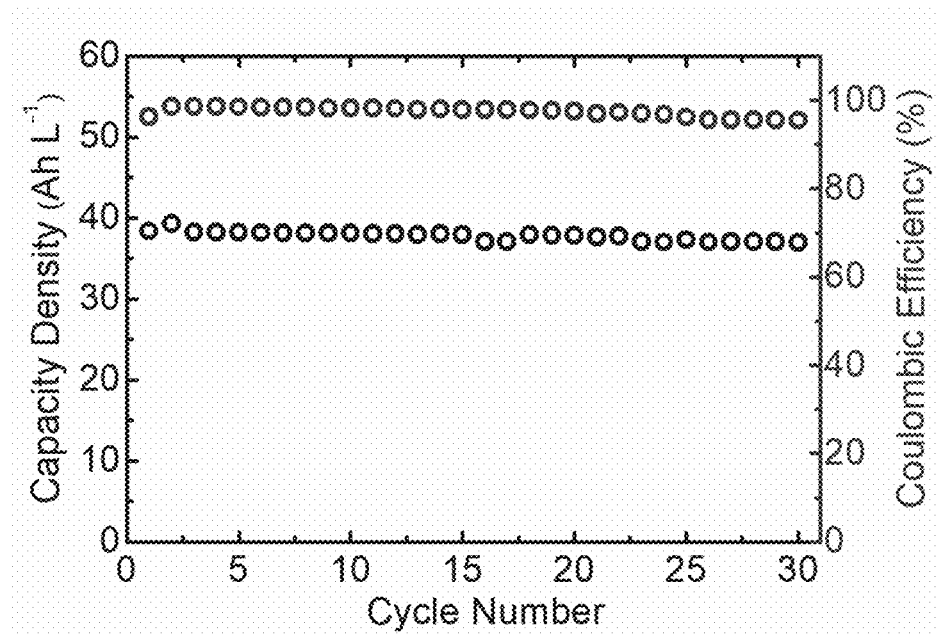
FIG. 8 shows the change in discharge capacity density and coulombic efficiency with increase in cycle number in a redox flow battery, obtained by applying a constant current of 0.1 A $cm^{-2}$ over the voltage window 0-1.65 V at 20° C., using 4 M HBr+0.1 M $Br_2$ on the positive side and 0.1 M $Li_6[P_2W_{18}O_{62}]$ in 1 M $H_2SO_4$ on the negative side of the flow battery.

Cycling data using 0.1 M $Li_6[P_2W_{18}O_{62}]$ at 0.1 A $cm^{-2}$ is shown in FIG. 8.

Compared to current state-of-the-art negative electrolytes for redox flow batteries, $Lis[P_2W_{18}O_{62}]$ has a much higher energy density, as shown in Table 2 below.

graphite plates (thickness 3 mm, channel width=0.16 cm, channel depth=0.2 cm, landing between channels=0.08 cm) were supplied by balticFuelCells GmbH and were pre-treated by heating with $HNO_3$ at 80° C. for 1 h. Five layers of Toray carbon paper (TCP-H-60) were supplied by Fuel Cell Etc. and were pre-treated by soaking in $H_2SO_4$:$HNO_3$, 3:1 v/v, for 3 h. Stainless steel plates were used as the current collectors.

The positive electrolyte was $Br^-/Br_2$ in water while the negative electrolyte was $\alpha$-$Li_6[P_2W_{18}O_{62}]$ in water or in 1 M $H_2SO_4$ solution. Both sides were separated by a Nafion 115 membrane and degassed with Ar for at least 1 h before the testing. The upper limit of the charging process was determined by both voltage and theoretical capacity.

During the charging process, HBr is oxidised to form $Br_2$, protons and electrons on the positive side while the protons and electrons are used to reduce and protonate the $Li_6[P_2W_{18}O_{62}]$, forming $[P_2W_{18}O_{62}]^{(n+6)-}$ on the negative side. During the discharge process, $[P_2W_{18}O_{62}]^{(n+6)-}$ undergoes oxidation to release protons and electrons while $Br_2$ is reduced back to HBr.

When reduced by 18 electrons per polyoxometalate molecule, 0.5 M $Li_6[P_2W_{18}O_{62}]$ has a charge capacity of 217 Ah $L^{-1}$. Thus a calculated energy density of around 213 Wh $L^{-1}$ can be obtained at this concentration at room temperature. The positive electrolyte (4 M HBr) has a charge capacity of 71.5 Ah $L^{-1}$. Herein, we use 50% more positive electrolyte than needed to balance the negative electrolyte, giving a practical energy density of around 45 Wh $L^{-1}$.

Gas Chromatography

Gas chromatography (GC) headspace analysis during reduction of $Li_6[P_2W_{18}O_{62}]$ by various amounts was performed using an Agilent Technologies 7890A GC system by direct injection of gas from the headspace of the polyoxometalate holding tank into the GC using a gas-tight syringe. The column used was a 30 metre-long 0.320 mm widebore HP-molesieve column (Agilent). The GC oven temperature was set to 27° C. and the carrier gas was Ar. The front inlet was set to 100° C. The GC system was calibrated for $O_2$ and $H_2$ using certified standards of these gases at a range of volume % in argon (0.5%-10%) supplied by CK Gas Products Limited (UK). Linear fits of volume % vs. peak area were obtained, which allowed peak areas to be converted into volume % of $H_2$ in the holding tank headspace. Charges passed were converted into expected volume % of hydrogen

TABLE 2

Comparison of electrolytes for redox flow batteries

| Negative electrolyte | Positive electrolyte | Open circuit voltage (V) | Energy density (Wh $L^{-1}$) | Power density (W $cm^{-2}$) | Reference |
| --- | --- | --- | --- | --- | --- |
| AQDS [a] | HBr/Br$^-$ | 0.6 | 20 | 0.6 at 40° C. | c |
| 2,6-DHAQ [b] | Ferrocyanide | 1.2 | 18.8 | 0.45 at RT | d |
| Viologens | TEMPO | 1.1 | 8 | N/A | e |
| $V^{2+}/V^{3+}$ | $VO_2^+/VO^{2+}$ | 1.26 | 43.1 | N/A | f |
| $Li_6[P_2W_{18}O_{62}]$ | HBr/Br$^-$ | 1.25 | 213 | 0.52 at 20° C. | This work |

[a] = 9,10-anthraquinone-2,7-disulfonic acid (AQDS);
[b] = 2,6-dihydroxyanthraquinone (2,6-DHAQ);
c = Huskinson et al.;
d = Lin et al.;
e = Janoschka et al.;
f = Li et al.

The flow cell system constructed comprised a mixture of commercially available and custom-made components. Electrodes for both sides were constructed as follows. End-plates were machined out of metallic aluminium. POCO detected by converting charges to an expected number of moles of $H_2$ (by dividing by 2F, where F is the Faraday constant), and then taking the volume of 1 mole of an ideal gas at room temperature and pressure to be 24.06 L. Faradaic efficiencies were then calculated by taking the ratio of the charge passed in order to generate the $H_2$ and that detected by gas chromatography.

Gas chromatography was also performed as above on the headspace of the polyoxometalate holding tank during redox cycling of the polyoxometalate as per FIG. 2(e). Electrochemical re-oxidation was performed on the reduced polyoxometalate solution. The charge extracted during re-oxidation was 2051 C, compared to 2171 C consumed in the original reduction, equating to a coulombic efficiency for polyoxometalate reduction and re-oxidation of 94.5%. Meanwhile, a Faradaic efficiency for hydrogen production of 4.8% was obtained, which matches well with the charge "missing" from the electrochemical re-oxidation process.

Gas chromatography analysis was further performed during dilution of reduced polyoxometalate solutions. Typically, 25 mL samples of 50 mM $Li_6[P_2W_{18}O_{62}]$ in $H_2O$ were reduced under argon in an airtight H-cell by 2171 C at a current density of 50 mA cm$^{-2}$ (this amount of charge is that required theoretically in order to reduce each polyoxometalate molecule by 18 electrons). After 2171 C of charge had been passed into the polyoxometalate solution, electrolysis was ceased. 0.5 mL of the reduced solution in the working electrode compartment was then removed under argon and injected into 12 mL of various solutions in airtight degassed containers as indicated in FIG. 3(b), giving a final concentration of polyoxometalate of 2 mM. The headspace of these airtight containers (total volume=48 mL) was then sampled at intervals using a gas-tight syringe and analysed by gas chromatography as described above.

Mass Spectrometry

The structural stability of $Li_6[P_2W_{18}O_{62}]$ after redox cycling was investigated by mass spectroscopy, which was collected by using a Bruker MS MaXis Impact instrument supplied by Bruker Daltonics Ltd. The detector was a time-of-flight, micro-channel plate detector and all data were processed using the Bruker Daltonics Data Analysis 4.1 software, whilst simulated isotope patterns were investigated using Bruker Isotope Pattern software and Molecular Weight Calculator 6.45. The calibration solution used was Agilent ESI L low concentration tuning mix solution, product No. G1969-85000, enabling calibration between approximately 50 m/z and 3200 m/z. This solution was diluted 10:1 with acetonitrile. Samples were introduced into the MS at a dry gas temperature of 180° C. The ion polarity for all recorded MS scans was negative, with the voltage of the capillary tip set at 4500 V, end plate offset at −500 V, funnel 1 RF at 400 Vpp and funnel 2 RF at 400 Vpp, hexapole RF at 200 Vpp, ion energy 5.0 eV, collision energy at 5 eV, collision cell RF at 1500 Vpp, transfer time at 100.0 μs, and the pre-pulse storage time at 10.0 μs.

The resulting spectra (data not shown) showed that the $[P_2W_{18}O_{62}]^{6-}$ anion does not undergo significant irreversible decomposition under the redox cycling conditions shown in FIG. 2(e).

REFERENCES

All documents mentioned in this specification are incorporated herein by reference in their entirety.
Bernardini et al. *Inorg. Chem.* 50, 5899 (2011)
Huskinson et al. *Nature* 505, 195 (2014)
Janoschka et al. *Nature* 527, 78 (2015)
Kato et al. *Dalton Trans.* 42, 11363 (2013)
Keita et al. *J. Electroanal. Chem.* 227, 77 (1987)
Kourasi et al. *Electrochimica Acta* 127, 454 (2014)
Launay et al. *J. Inorg. Nucl. Chem.* 38, 807-16 (1976)
Li et al. *Adv. Energy Mater.* 1, 394 (2011)
Lin et al. *Science,* 349, 1529 (2015)
Millet et al. *Int. J. Hydrogen Energy* 35, 5043 (2010)
Papaconstantinou et al. *Inorg. Chem.* 6, 1152-1155 (1967)
Pope et al. *Inorg. Chem.* 6, 1147 (1967)
Pope, M. T. *Heteropoly and Isopoly Oxometalates*. Springer-Verlag, Heidelberg, Germany (1983)
Prenzler et al. *Analytical Chemistry* 71, 3650 (1999)
Richardt et al. *Inorg. Chem.* 40, 703 (2001)
US 2014/0287330
US 2016/043425
Way et al. *Inorg. Chem.* 36, 2826-2833 (1997)
WO 2013/068754
WO 2016/038214
Wang et al. *J. Phys. Chem. B* 108, 1365 (2004)
Xu et al. *Int. J. Hydrogen Energy* 37, 2985 (2012)

The invention claimed is:

1. A method for producing hydrogen, the method comprising the steps of:
   (i) reducing a mediator by four or more electrons to yield a reduced mediator;
   (ii) oxidising a reduced mediator to yield a mediator, and reducing protons to yield hydrogen;
   wherein the reduced mediator of step (i) is used as the reduced mediator of step (ii), or the mediator of step (ii) is used as the mediator of step (i);
   wherein the mediator in step (i) is (a) reduced by five or more electrons and/or (b) provided in an aqueous electrolyte solution at a concentration of at least 2 mM.

2. The method of claim 1, wherein the mediator is reduced by six or more electrons, or seven or more electrons.

3. The method of claim 1, wherein the mediator is reduced by ten or more electrons, or 18 electrons.

4. The method of claim 1, wherein the mediator is a polyoxometalate.

5. The method of claim 4, wherein the polyoxometalate has 12 or more, or 18 or more metal atoms.

6. The method of claim 4, wherein the polyoxometalate is of formula $[X_2M_{18}O_{62}]^{n-}$, where M is a metal, selected from Mo, W and V, and mixtures thereof, X is selected from P and S and mixtures thereof, and n is 3, 4, 5 or 6 as appropriate.

7. The method of claim 6, wherein the polyoxometalate is of formula $[P_2W_{18}O_{62}]^{6-}$.

8. The method of claim 1, where step (ii) comprises exposing the mediator to a catalyst.

9. The method of claim 8, wherein the catalyst is a platinum-containing catalyst.

10. A battery comprising a working electrode and a counter electrode, wherein the working electrode side comprises an electrolyte holding a mediator that may reversibly accept 4 or more electrons, and/or a reduced form of the mediator that may reversibly donate 4 or more electrons, and the counter electrode side comprises:
    (i) an electrolyte holding a redox active agent in reduced and/or oxidised form; or
    (ii) an electrolyte holding an oxygen source, and/or holding or exposed to oxygen, and
    wherein the mediator is (a) reduceable by five or more electrons and/or (b) provided in the electrolyte at a concentration of at least 2 mM.

11. The battery of claim 10, wherein the mediator is reduceable by six or more electrons, or seven or more electrons.

12. The battery of claim 10, wherein the mediator is reduceable by ten or more electrons, or 18 electrons.

13. The battery of claim 10, wherein the mediator is a polyoxometalate.

14. The battery of claim 13, wherein the polyoxometalate has 16 or more, or 18 or more metal atoms.

15. The battery of claim 14, wherein the polyoxometalate is of formula $[X_2M_{18}O_{62}]^{n-}$, where M is a metal, selected from Mo, W and V, and mixtures thereof, X is selected from P and S and mixtures thereof, and n is 3, 4, 5 or 6 as appropriate.

16. The battery of claim 15, wherein the polyoxometalate is of formula $[P_2W_{18}O_{62}]^{6-}$.

17. The battery of claim 10, which is:
    (i) a flow battery;
    (ii) a charged battery wherein the battery contains predominately the reduced form of the mediator; or
    (iii) a discharged battery wherein the battery contains predominately the mediator.

18. The method of claim 1, wherein the concentration of the mediator in the aqueous electrolyte solution is at least 5, 10, 20 or 50 mM.

19. The method of claim 1, wherein the concentration of the mediator in the aqueous electrolyte solution is at most 1,000, 2,000 or 5,000 mM.

20. The method of claim 1, wherein the mediator in step (i) is (b) provided in an aqueous electrolyte solution, which is an acidic aqueous electrolyte solution, for example at a pH of pH 4 or less.

21. The battery of claim 10, wherein the mediator is provided in an electrolyte at a concentration of at least 5, 10, 20 or 50 mM.

22. The battery of claim 10, wherein the mediator is provided in an electrolyte is at a concentration of at most 1,000, 2,000 or 5,000 mM.

23. The battery of claim 10, wherein the mediator is provided in an acidic aqueous electrolyte solution.

* * * * *